(12) United States Patent
Galin et al.

(10) Patent No.: US 11,652,351 B2
(45) Date of Patent: *May 16, 2023

(54) CONDUCTOR TEMPERATURE DETECTOR

(71) Applicant: Solaredge Technologies Ltd., Herzeliya (IL)

(72) Inventors: Yoav Galin, Raanana (IL); Meir Adest, Modiin (IL); Israel Gershman, Yehud (IL); Guy Sella, Bitan Aharon (IL)

(73) Assignee: Solaredge Technologies Ltd., Herzeliya (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/493,894

(22) Filed: Oct. 5, 2021

(65) Prior Publication Data
US 2022/0102962 A1 Mar. 31, 2022

Related U.S. Application Data

(63) Continuation of application No. 16/844,212, filed on Apr. 9, 2020, now Pat. No. 11,165,241, which is a (Continued)

(51) Int. Cl.
*H02H 3/00* (2006.01)
*H02J 3/46* (2006.01)
(Continued)

(52) U.S. Cl.
CPC ............... *H02J 3/46* (2013.01); *G01K 11/06* (2013.01); *H01H 33/02* (2013.01); *H01H 85/04* (2013.01);
(Continued)

(58) Field of Classification Search
None
See application file for complete search history.

(56) References Cited

U.S. PATENT DOCUMENTS 3,781,737 A 12/1973 Henry
4,135,177 A 1/1979 Kelley et al.
(Continued)

FOREIGN PATENT DOCUMENTS

CN 1385684 A 12/2002
CN 101221683 A 7/2008
(Continued)

OTHER PUBLICATIONS

Feb. 1, 2018—EP Search Report, EP App. No. 17186631.2.
(Continued)

*Primary Examiner* — Stephen W Jackson
(74) *Attorney, Agent, or Firm* — Banner & Witcoff, Ltd.

(57) ABSTRACT

Various implementations described herein are directed to a method for detecting, by a device, an increase in temperature at certain parts of an electrical system, and taking appropriate responsive action. The method may include measuring temperatures at certain locations within the system and estimating temperatures at other locations based on the measurements. Some embodiments disclosed herein include an integrated cable combining electrical conduction and heat-detection capabilities, or an integrated cable or connector combining electrical conduction with a thermal fuse.

20 Claims, 18 Drawing Sheets

Related U.S. Application Data continuation of application No. 15/669,114, filed on Aug. 4, 2017, now Pat. No. 10,658,833, which is a continuation-in-part of application No. 15/078,450, filed on Mar. 23, 2016, now Pat. No. 11,062,588.

(60) Provisional application No. 62/376,693, filed on Aug. 18, 2016.

(51) Int. Cl.
| | |
|---|---|
| H02H 3/33 | (2006.01) |
| H02H 1/00 | (2006.01) |
| H01H 85/04 | (2006.01) |
| H01H 33/02 | (2006.01) |
| H02S 40/36 | (2014.01) |
| G01K 11/06 | (2006.01) |
| H02S 40/34 | (2014.01) |
| H02J 7/35 | (2006.01) |
| H02J 3/38 | (2006.01) |
| G08B 17/06 | (2006.01) |

(52) U.S. Cl.
CPC .......... *H02H 1/0015* (2013.01); *H02H 3/334* (2013.01); *H02J 3/38* (2013.01); *H02J 3/381* (2013.01); *H02J 7/35* (2013.01); *H02S 40/34* (2014.12); *H02S 40/36* (2014.12); *G08B 17/06* (2013.01); *H02J 2300/26* (2020.01); *Y02E 10/56* (2013.01)

(56) References Cited

U.S. PATENT DOCUMENTS

| | | | |
|---|---|---|---|
| 4,246,564 | A | 1/1981 | Olson et al. |
| 4,276,531 | A | 6/1981 | Davis |
| 5,841,617 | A | 11/1998 | Watkins, Jr. et al. |
| 7,965,485 | B2 | 6/2011 | Mosesian et al. |
| 10,658,833 | B2* | 5/2020 | Galin ............ H02S 40/36 |
| 2006/0208845 | A1* | 9/2006 | Yoshikawa .......... H01H 37/765 337/159 |
| 2008/0121481 | A1 | 5/2008 | Mitsuhashi et al. |
| 2008/0147335 | A1 | 6/2008 | Adest et al. |
| 2009/0316321 | A1 | 12/2009 | Ouwerkerk |
| 2010/0134959 | A1 | 6/2010 | Fife et al. |
| 2010/0241375 | A1 | 9/2010 | Kumar et al. |
| 2011/0058337 | A1 | 3/2011 | Han et al. |
| 2012/0180843 | A1 | 7/2012 | Park |
| 2012/0280506 | A1 | 11/2012 | Ives et al. |
| 2013/0002335 | A1 | 1/2013 | DeGraaff |
| 2013/0194706 | A1 | 8/2013 | Har-Shai et al. |
| 2015/0288329 | A1 | 10/2015 | Zheng et al. |
| 2015/0318410 | A1 | 11/2015 | Higuma |
| 2017/0133844 | A1 | 5/2017 | Goldin et al. |
| 2017/0248123 | A1 | 8/2017 | Hales et al. |

FOREIGN PATENT DOCUMENTS

| | | |
|---|---|---|
| CN | 101595546 A | 12/2009 |
| CN | 101609971 B | 9/2012 |
| CN | 102272936 B | 4/2014 |
| CN | 103888058 A | 6/2014 |
| CN | 103888061 A | 6/2014 |
| CN | 104471415 A | 3/2015 |
| CN | 205666219 U | 10/2016 |
| DE | 202006007613 U1 | 8/2006 |
| FR | 2827077 A1 | 1/2003 |
| JP | 2010-032395 A | 2/2010 |
| KR | 10-1550588 B1 | 9/2015 |
| WO | 87/02835 A1 | 5/1987 |
| WO | 99/67862 A1 | 12/1999 |
| WO | 2014027043 A1 | 2/2014 |

OTHER PUBLICATIONS

Jan. 2009—Chou—Automatic Diagnosis System of Electrical Equipment Using Infrared Thermography, 2009, pp. 1-13.
Mar. 3, 2020—CN Office Action—CN 201710129079.1.
Nov. 17, 2020—JP Office Action—JP 2017-051973.
Dec. 16, 2020—CN Office Action—CN 201710696655.0.

* cited by examiner

CONDUCTOR TEMPERATURE DETECTOR

RELATED APPLICATIONS

The present application is a continuation of U.S. patent application Ser. No. 16/844,212, filed Apr. 9, 2020, which is a continuation of U.S. patent application Ser. No. 15/669,114, filed Aug. 4, 2017, now U.S. Pat. No. 10,658,833, which is a continuation in part (CIP) application of U.S. patent application Ser. No. 15/078,450, filed Mar. 23, 2016, now U.S. Pat. No. 11,062,588, and claims the benefit of U.S. provisional application Ser. No. 62/376,693, filed Aug. 18, 2016, which are hereby incorporated by reference in their entireties.

BACKGROUND

Faulty connectors and/or conductors may cause overheating of components in electrical systems, and in some cases may even cause fires. Arc detection circuits might not always be triggered in cases of overheating. Overheating of conductors may be an especially acute problem in renewable power systems (e.g. photovoltaic and wind-power systems), where temperatures of system components may already be high due to exposure to the sun and the heating of components during power generation and conversion. Additionally, connectors may be prone to overheating due to the erosion of electrical contact mechanisms over time. Cost-effective detection of overheating of sections of power systems which are not adjacent to components containing logical circuitry (e.g. connectors or conductor areas which are not adjacent to system sensors and/or devices) may be an especially challenging task. There is a need for effective solutions for rapid detection of and response to overheating of components in such systems.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ temperature sensing devices configured to detect overheating of components within a power system.

In illustrative electrical systems, a temperature sensor may be deployed a certain distance from a point considered susceptible to overheating, such as a connection point. Since heat may dissipate rapidly when traveling through a physical medium, the system may be designed for placement of sensors close enough to susceptible points to measure an increase in temperature which may trigger preventative actions such as disconnecting elements of the electrical system. In some systems, it might not be convenient or cost-effective to place temperature sensors close enough to sensitive points to detect overheating. In those systems, it may be desirable to combine thermocouple (TC) or linear heat detection (LHD) cables with the standard system conductors to allow detection of excessive heat at longer distances.

In many electrical systems, especially those exposed to weather conditions, connection points may be the most susceptible to intrusion of moisture and dirt, which may lead to increased electrical impedance and possible overheating. In some photovoltaic electrical systems, faulty connectors have overheated, leading to destructive fires. Therefore, many illustrative embodiments include detecting overheating at or near connection points (e.g. placement of a temperature sensor in or within 20 cm of a connection point), though this disclosure is not limiting in that respect and applies to overheating detection at other locations as well.

In some illustrative embodiments, designing for connector locations near temperature sensors may help detect high temperatures. For example, in certain systems such as some photovoltaic (PV) installations, a connection point may be formed by connecting two cables, with the connection point in proximity to a circuit (e.g. a direct current to alternating current (DC-AC) inverter such as a DC-AC micro-inverter, or a direct current to direct current (DC-DC) converter). In cases where the cables are of significant length, by designing cables of asymmetric length, proximity of each connection point to a power device may be achieved. For example, each power device may feature one cable 0.8 meters long, and one cable 0.2 meters long. In this case, if multiple power devices are coupled to one another, each connection point is only 0.2 meters away from a power device, and at that relatively short distance, a temperature sensor adjacent to the power device may detect overheating at the connection point.

In some embodiments, it may be desirable to detect overheating of electrical conductors at locations which might not be near connector locations. For example, in some photovoltaic installations, portions of electrical conductors may be in contact with metallic objects (e.g. outdoor metallic mounting structures which reach high temperatures), and/or may be adjacent to an inflammable agent (e.g. a wooden rooftop), and/or may be chewed on and damaged by animals, increasing the risk of overheating. Illustrative embodiments include integrated electrical cables combining electrical conductors with heat detection devices (e.g. thermocouple and LHD devices) which may detect overheating at locations not adjacent to thermal sensors deployed by connection locations.

Configuration of overheating detection systems and devices may vary according to system characteristics and requirements. For example, in some embodiments, a temperature threshold may be set to trigger a response to prevent melting of electrical conductor insulation. In some embodiments, a different temperature threshold may be set to trigger a response to prevent a wooden rooftop from catching fire or a tar roof coating from melting.

In some embodiments, a temperature threshold may be set at a temperature sensor to prevent overheating to a certain temperature at a location susceptible to overheating. The relationship between the temperature measured by a temperature sensor at a sensor location and the temperature at a location susceptible to overheating may be different depending on the distances between the two locations, the physical medium and the materials comprising the components of the electrical system.

Responses to a potentially unsafe overheating condition may vary. In some embodiments, a potentially unsafe overheating condition may trigger an automatic action, such as opening safety switches to disconnect the point of overheating from other circuitry. In some embodiments, a potentially unsafe overheating condition may trigger a disconnection of one or more thermal fuses disposed at electrical connection points. In some embodiments, a potentially unsafe overheating condition may trigger an overheating response such as operating a power device (e.g., a power converter) to reduce power drawn from a power source (e.g., a photovoltaic generator) and/or reducing voltage or current provided at the output of the power converter. In some embodiments, a potentially unsafe overheating condition may trigger an overheating response such as triggering an alarm system and/or updating a user interface monitored by a system owner and/or system maintenance personnel.

In some systems, analyses of previous instances of overheating may assist in predicting overheating events. For example, a system may feature certain patterns of voltage and current levels in different parts of the system prior to or at the early stages of overheating. Since many systems include data logging of operating parameters (e.g. voltage, current, frequency, harmonic content, solar irradiance etc.), in some instances it is possible to predict overheating based on measurements other than temperature, and take preventative action.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
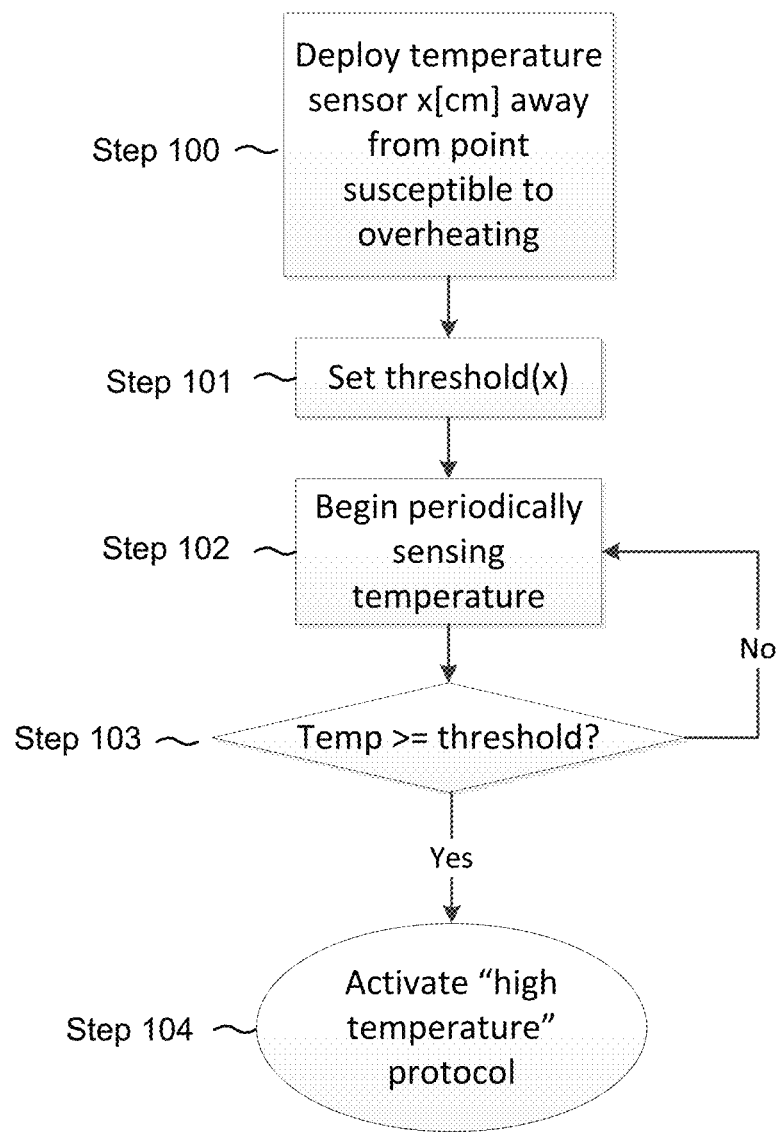
FIG. 1 is a flow diagram of a method for detecting overheating in an electrical conductor according to one or more illustrative aspects of the disclosure.

Reference is now made to FIG. 1, which shows a flow diagram of a method for detecting overheating in an electrical conductor according to one or more illustrative aspects of the disclosure. At step 100, a temperature sensor may be deployed at a distance of x[cm] from a point considered to be susceptible to overheating (e.g. a connection point, hereafter referred to as "CP"). By solving appropriate thermal differential equations, the temperature at the CP may be estimated as a function of the temperature measured by the sensor. In some embodiments, the relationship between the temperature at the CP and the temperature measured by the sensor may be empirically determined prior to deploying the sensor and connecting conductors at the connection point. For example, a sensor may be placed adjacent to a conductor in lab conditions, with a connection point x[cm] away. The connection point may be heated to a set of different temperatures, with the various CP temperatures and corresponding sensor measurements logged for future reference. In some embodiments, a lookup table may be created, the lookup table relating the temperature at the CP to the temperature measured by the sensor. The lookup table may be saved to memory on a device carrying out the method of FIG. 1 for reference during the course of the method, and/or may be used to configure the device before carrying out the method of FIG. 1. In some embodiments, CP temperatures and corresponding sensor measurements may be used to create a mathematical model relating an approximation of CP temperatures to the sensor measurements. The mathematical model may be a linear, higher-order polynomial, logarithmic, exponential or rational function. For example, in some embodiments where the physical structure between the temperature sensor and the CP comprises a single material and/or simple geometric shapes, a linear approximation may suffice to obtain a reasonably accurate approximation of the CP temperature. In some embodiments where the physical structure between the temperature sensor and the CP comprises multiple materials and/or sophisticated geometric shapes, a higher-order polynomial, a logarithmic or exponential function may provide a more accurate approximation of the CP temperature.

The temperature sensor deployed at step 100 may be coupled to a communication and/or processing device for receiving measurements from the sensor and transmitting and/or processing the measurements. For example, the sensor may output measurements onto an information bus, and the measurements may be read by a control device (e.g. a microprocessor, Digital Signal Processor (DSP), Field Programmable Gate Array (FPGA), Application Specific Integrated Circuit (ASIC) or other device), a communication device (e.g. a wireless transceiver, a power-line-communication (PLC) device and/or an acoustic communication device) and/or a memory device. A control device may be coupled to the sensor within a single device, or a control device may be remote and may process measurements transmitted by a communication device.

At step 101, a control device may be configured to respond to a temperature measurement above a threshold. The threshold may be determined in accordance with solving equations relating the temperature at the CP to the temperature measured at the sensor, or in accordance to a relationship determined to exist between the temperature at the CP and the temperature measured by the sensor and stored by a lookup table as disclosed above. In some embodiments, the threshold may be an absolute temperature. For example, a threshold may be set to 100° C., 200° C. or 300° C. A fixed threshold may be set with regard to the flammability of materials near the CP. For example, conductors used in photovoltaic installations may be insulated using cross-linked polyethylene (XLPE), polyvinyl chloride (PVC) or chlorinated polyvinyl chloride (CPVC). XLPE-insulated conductors may have a rated maximum conductor temperature of 90° C., an emergency rating of up to 140° C. and a short-circuit rating of 250° C. If protecting the insulation is desired, a threshold may be set with regard to the emergency rating. Cables having PVC or CPVC insulation or other types of insulation may feature different ratings, and different thresholds may be set accordingly.

In some embodiments, a threshold may be set with regard to the flammability of structures supporting the electrical system. For example, many photovoltaic electrical systems are mounted on buildings having wooden roofs. The temperature at which wood begins to burn depends on the type of wood, but typically, the pyrolysis of wood begins at temperatures around 250° C. Some roofs may be coated with tar, which may begin to auto-ignite at about 315° C. In some embodiments, a system may be configured to not protect the conductor insulation from melting, but a response to protect the supporting roof from catching fire may be desirable.

In some embodiments, the threshold may be adaptive and may be set with relation to a previously measured temperature or previously measured system parameter values (e.g. voltage, current, solar irradiance). For example, a threshold may be set as THRESH[° C.]=baseline[° C.]+delta[° C.], where baseline[° C.] may be a temperature measured over period of time, and delta may be an increase in temperature over a period of time. For example, if a sensor measures a steady temperature 100±5[° C.] for one hour, delta may be set to equal 50[° C.] and the threshold may be 100[° C.]+50[° C.]=150[° C.]. If the steady temperature decreases to 90±5[° C.] for one hour, delta may still be set to equal 50[° C.] and the new threshold may be 90[° C.]+50[° C.]=140[° C.]. In some embodiments, delta may depend on baseline. For example, delta may equal 50[° C.] if baseline=100[° C.], while delta may equal 45[° C.] if baseline=90[° C.]. In some embodiments, the threshold may be set with regard to a probabilistic function. For example, the method may be interested in the temperature at a connection point, and the threshold may be set such that the temperature at the connection point remains below a certain temperature with high probability. For example, empirically-obtained data and/or mathematical models may indicate that when a sensor measures 100[° C.], the temperature at a connection point 20 cm away is above 90[° C.] with probability 50%, and when the sensor measures 110[° C.], the temperature at a connection point 20 cm away is above 90[° C.] with probability 80%. The threshold may be selected to trigger a response with regard to the acceptable temperature at the connection point and the probability of the acceptable temperature being surpassed.

In some embodiments, different thresholds may be set depending on other external variables. For example, temperature measurements may be considered in conjunction with other sensor measurements, such as voltage, current, solar irradiance, moisture or other measurements. For example, in a system a first threshold may be set to trigger a response if a temperature of 200° C. is measured 10 [cm] from an electrical connection and a current of 10[A] is measured to be flowing through the connection, with a second threshold set to trigger a response if a temperature of 180° C. is measured 10 [cm] from an electrical connection and a current of 12[A] is measured to be flowing through the connection.

In some embodiments, a system may be configured to respond to a temperature remaining above one or more thresholds for a period of time. For example, a system may be configured to respond to a first threshold temperature of 200° C. persisting for 10 seconds, and to respond to a second threshold temperature of 160° C. persisting for 12 seconds.

In some embodiments, a threshold may be set with regard to an increase in temperature. For example, a system may be configured to respond to an increase of 10° C. or more in 20 seconds or less, regardless of the absolute temperatures measured. In some embodiments, a system may be configured to respond to a variable increase of temperature which varies depending on the absolute temperature measured, as described above.

The thresholds described herein are only illustrative examples which may be used in different systems. Various combinations thereof may be applied to various electrical systems depending on system characteristics and requirements. At step 102, the temperature sensor may begin to periodically measure temperatures for transmission to control and/or memory devices. At step 103, a control device may compare a measured temperature to the threshold obtained at step 101. If the temperature is below the threshold, the operating conditions may be assumed to be safe and normal system operation may continue, with the method returning to step 102. In some embodiments, the method may periodically return to step 101, to recalculate the threshold based on current temperature measurements. If, at step 103, a temperature equal to or greater than the threshold is measured, the method may proceed to step 103, where an overheating response such as a "high temperature protocol" (HTP) is activated. In some embodiments, the HTP may comprise a controller automatically disconnecting the connection point from electrical current. In some embodiments, the HTP may comprise a controller reducing the electrical current flowing through the connection point, for example, by reducing power drawn from a power source connected at the input to the power device. In some embodiments, the controller may be coupled via a communication device to a wired and/or wireless network(s)/Internet/Intranet, and/or any number of end user device(s) such as a computer, smart phone, tablet and/or other devices such as servers which may be located at a network operations center and/or monitoring center. These devices may be utilized to generate a warning of a dangerous condition, determine when a dangerous condition is probable, detect the type of dangerous condition and/or take action to degrade or turn off certain portions a system. These warnings can be audio and/or visual. They may, for example, be a beep, tone, siren, LED, and/or high lumen LED.

Figure 2:
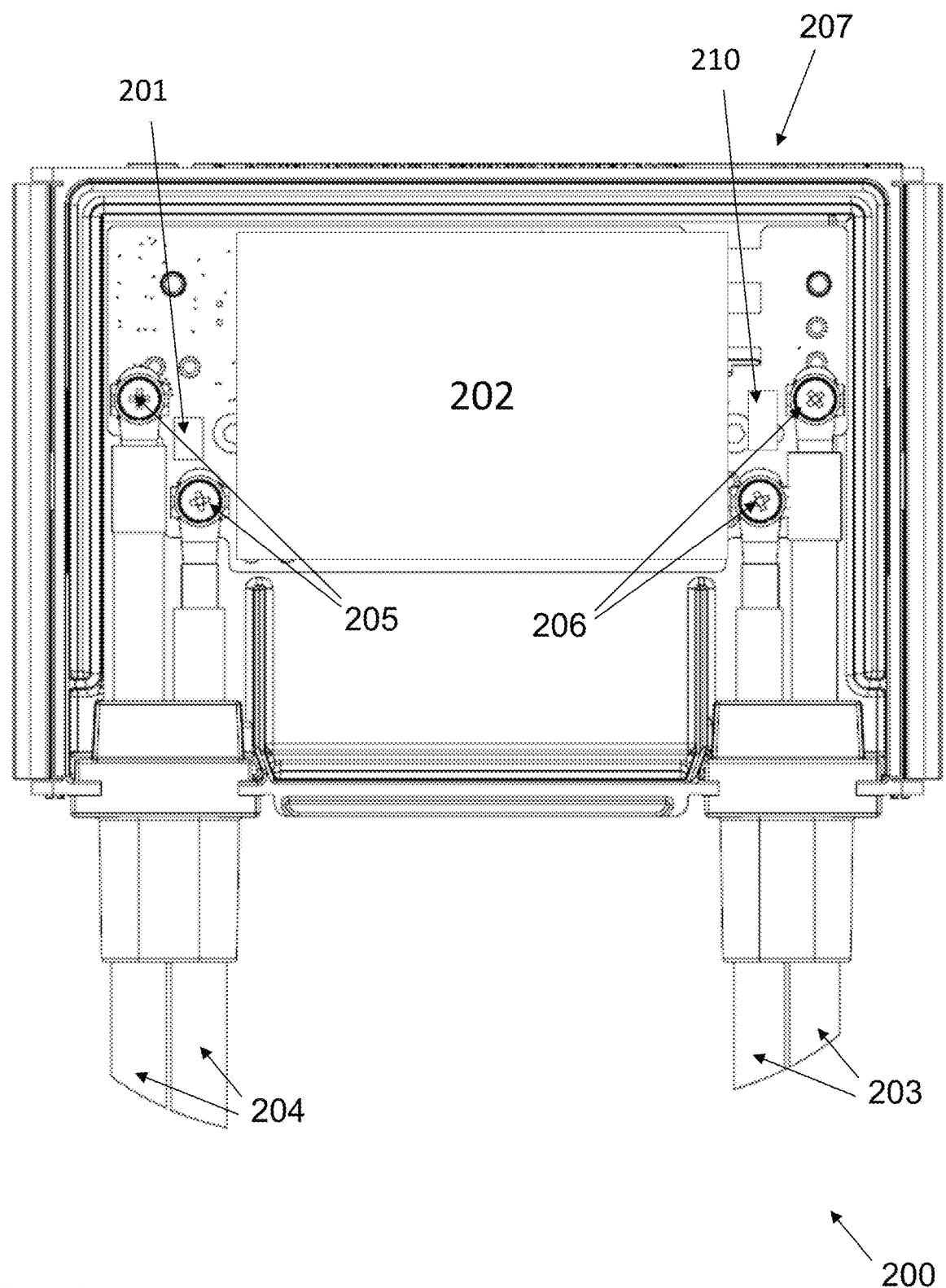
FIG. 2 is part-schematic, part block diagram of a system for detecting overheating in an electrical conductor according to one or more illustrative aspects of the disclosure.

Reference is now made to FIG. 2, which shows part of a system for detecting overheating in an electrical conductor according to one or more illustrative aspects of the disclosure. Power device 200 may be configured to receive input electrical power from a power source (e.g. PV generator, wind turbine, hydro-turbine, battery, supercapacitor, fuel cell, etc.) and output electrical power to a load, such as an electrical device, a grid, a home, or a battery. PV generators may include one or more solar panels, solar cells, solar shingles, and/or strings (e.g. serial strings or parallel strings) of solar panels or solar cells. Power device 200 may comprise input conductors 203 for receiving electrical power, and output conductors 204 for outputting electrical power. Power device 200 may comprise circuitry 202 for power processing, control, monitoring, safety, and communication. Various elements comprising circuitry 202 will be described in greater detail later on in this disclosure. Circuitry 202 may receive power from input conductors 203, and output power via output conductors 204.

Still referring to FIG. 2, enclosure 207 may physically house the electrical components comprising a photovoltaic module, for example, power device 200. Enclosure 207 may be a closed or partially closed compartment. In some embodiments, enclosure 207 may comprise a portion of a junction box for a photovoltaic module (e.g. a PV generator), or may comprise a lid configured to fit to a junction box for a photovoltaic module. Input conductors 203 may be physically connected to enclosure 207 using an appropriate connecting method, such as, in this illustrative embodiment, screws 206. In some embodiments, input conductors may be secured to the enclosure by soldering, clamping or other methods. An electrical connection between input conductors 203 and circuitry 202 may be provided by a conducting path deployed between screws 206 and circuitry 202. Similarly, output conductors 204 may be physically connected to enclosure 207 using an appropriate connecting method, such as, in this illustrative embodiment, screws 205. In some embodiments, output conductors may be secured to the enclosure by soldering, clamping or other methods. An electrical connection between output conductors 204 and circuitry 202 may be provided by a conducting path deployed between screws 205 and circuitry 202.

Still referring to FIG. 2, temperature sensor 201 may be deployed adjacently to screws 205, and may be configured to transfer temperature measurements to controller or communication device (e.g. a controller or communication device included in circuitry 202). In case of overheating of one of output conductors 204, the temperatures measured by temperature sensor 201 may increase. Similarly, temperature sensor 210 may be similar to or the same as temperature sensor 201 may be deployed near screws 206 and may measure increases in temperature on or near input conductors 203. Temperature sensors 201 and/or 210 may be thermocouple devices, IC temperature sensors, silicon bandgap temperature sensors, thermistors, or any other suitable temperature sensor.

Figure 3:
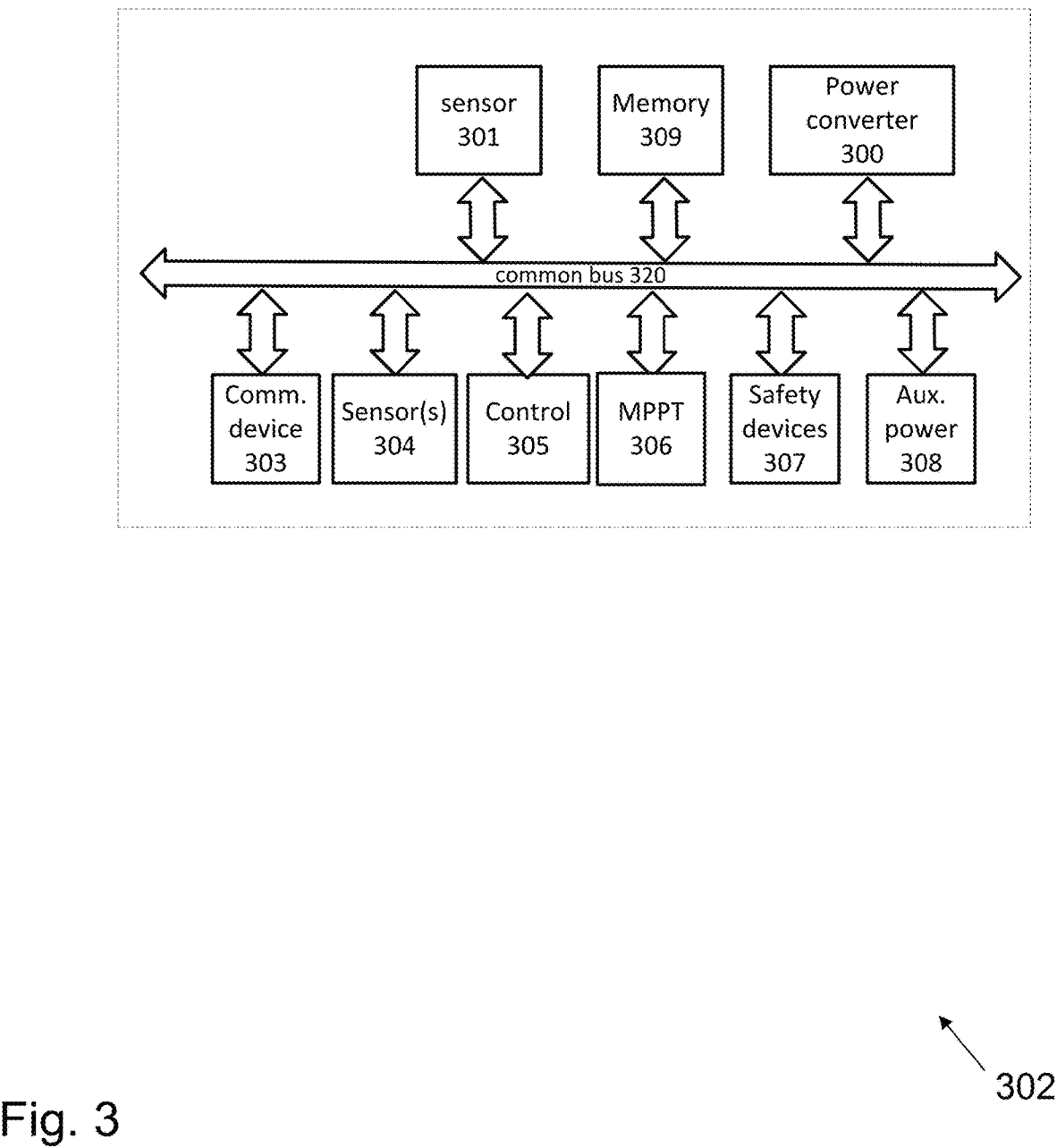
FIG. 3 is part-schematic, part block diagram of a system for detecting overheating in an electrical conductor according to one or more illustrative aspects of the disclosure.

Reference is now made to FIG. 3, which illustrates circuitry 302 such as circuitry which may be found in a power device such as power device 200, according to an illustrative embodiment. Circuitry 302 may be similar to or the same as circuitry 202 illustrated in FIG. 2. In some embodiments, circuitry 302 may include power converter 300. Power converter 300 may comprise a direct current-direct current (DC/DC) converter such as a buck, boost, buck/boost, buck+boost, Cuk, Flyback and/or forward converter. In some embodiments, power converter 300 may comprise a direct current—alternating current (DC/AC) converter (also known as an inverter), such a micro-inverter. In some embodiments, circuitry 302 may include Maximum Power Point Tracking (MPPT) circuit 306, configured to extract increased power from a power source the power device is coupled to. In some embodiments, power converter 300 may include MPPT functionality. MPPT functionality may include, for example, a "perturb and observe" method and/or impedance matching. Circuitry 302 may further comprise control device 305 such as an analog control device, a microprocessor, Digital Signal Processor (DSP), Application-Specific Integrated Circuit (ASIC) and/or a Field Programmable Gate Array (FPGA).

Still referring to FIG. 3, control device 305 may control and/or communicate with other elements of circuitry 302 over common bus 320. In some embodiments, circuitry 302 may include circuitry and/or sensors/sensor interfaces 304 configured to measure parameters directly or receive measured parameters from connected sensors and/or sensor interfaces 304 configured to measure parameters on or near the power source, such as the voltage and/or current output by the power source and/or the power output by the power source. In some embodiments, the power source may be a PV generator, and a sensor or sensor interface may directly measure or receive measurements of the irradiance received by the generator and/or the temperature on or near the generator. In some embodiments, sensor 301 may be part of sensors/sensor interfaces 304, and in some embodiments sensor 301 may be a separate sensor. Sensor 301 may be similar to or the same as temperature sensor 201 of FIG. 2. For example, sensor 301 may be a temperature sensor deployed near a connection to a conductor, to monitor the temperature on or near the conductor to detect potential overheating.

Still referring to FIG. 3, in some embodiments, circuitry 302 may include communication device 303, configured to transmit and/or receive data and/or commands from other devices. Communication device 303 may communicate using Power Line Communication (PLC) technology, acoustic communication technology, or wireless technologies such as ZIGBEE™, Wi-Fi, BLUETOOTH™, cellular communication or other wireless methods. In some embodiments, circuitry 302 may include memory device 309, for logging measurements taken by sensor(s)/sensor interfaces 304 and/or sensor 301, to store code, operational protocols or other operating information. Memory device 309 may be flash, Electrically Erasable Programmable Read-Only Memory (EEPROM), Random Access Memory (RAM), Solid State Devices (SSD) or other types of appropriate memory devices.

Still referring to FIG. 3, in some embodiments, circuitry 302 may include safety devices 307 (e.g. fuses, circuit breakers and Residual Current Detectors). Safety devices 307 may be passive or active. For example, safety devices 307 may comprise one or more passive fuses disposed within circuitry 302 and designed to melt when a certain current flows through it, disconnecting part of circuitry 302 to avoid damage. In some embodiments, safety devices 307 may comprise active disconnect switches, configured to receive commands from a controller (e.g. control device 305, or an external controller) to disconnect portions of circuitry 302, or configured to disconnect portions of circuitry 302 in response to a measurement measured by a sensor (e.g. a measurement measured by sensor 301 or sensors/sensor interfaces 304). In some embodiments, circuitry 302 may comprise auxiliary power unit 308, configured to receive power from a power source coupled to circuitry 302, and output power suitable for operating other circuitry components (e.g. control device 305, communication device 303, etc.). Communication, electrical coupling and/or data-sharing between the various components of circuitry 302 may be carried out over common bus 320.

Figure 4:
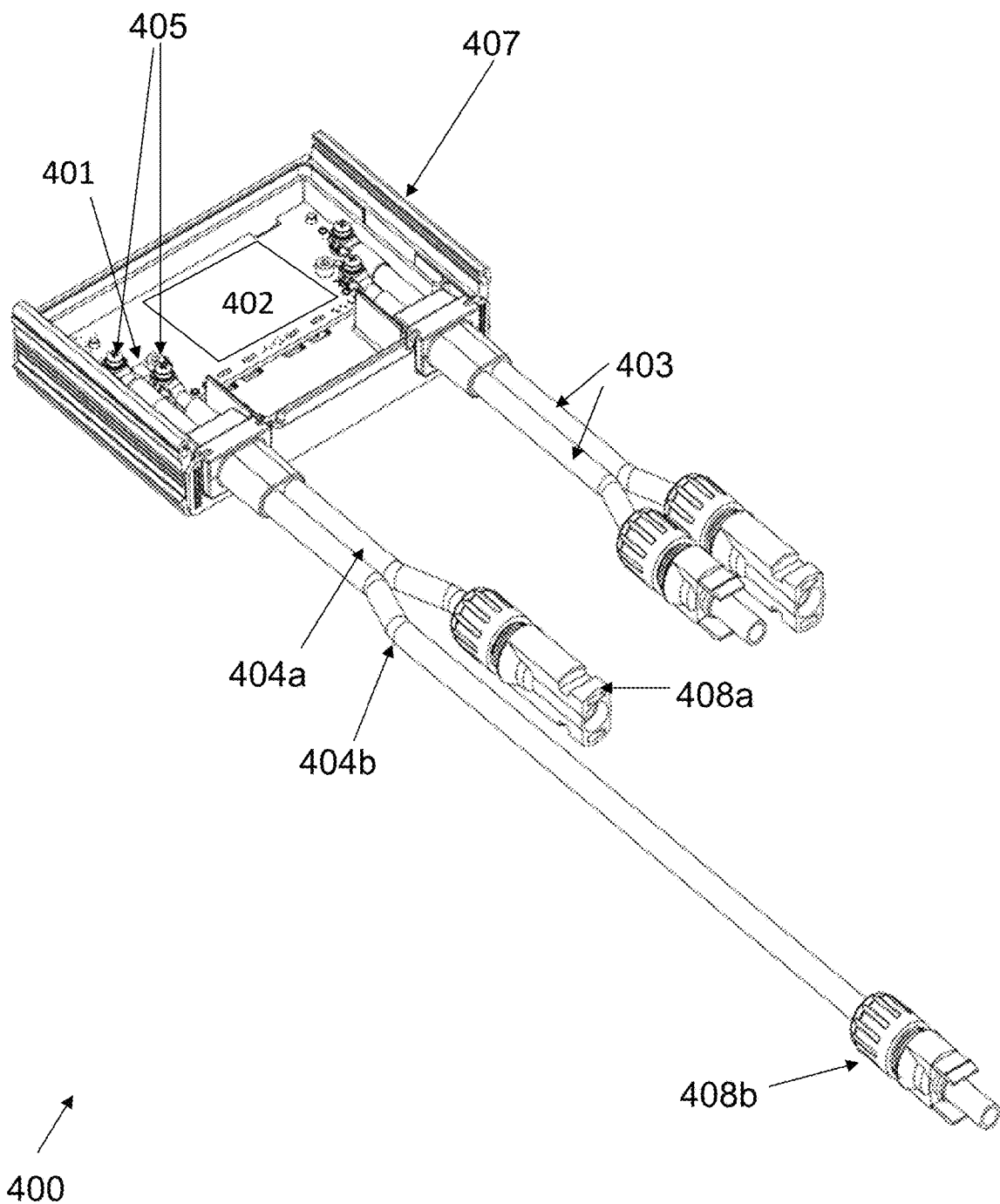
FIG. 4 is part-schematic, part block diagram of a system for detecting overheating in an electrical conductor according to one or more illustrative aspects of the disclosure.

Reference is now made to FIG. 4, which illustrates aspects of illustrative embodiments. Power device 400 may comprise casing 407, circuitry 402, input conductors 403, output conductors 404a and 404b and fastening screws 405 which may be similar to or the same as similar components illustrated with regard to other embodiments disclosed herein. For example, circuitry 402 may include some or all of the components of circuitry 202 illustrated in FIG. 2. Temperature sensor 401 may be similar to or the same as sensors 201 and 210 of FIG. 2. In the illustrative embodiment depicted in FIG. 4, no sensor is deployed adjacently to input conductors 403, but alternative embodiments may include a sensor disposed adjacently to input conductors 403 and/or additional sensors. Connectors 408a and 408b may be connected at the ends of output conductors 404a and 404b, respectively, and may be configured to connect to connectors on other conductors fitted to be connectable to them. For example, connector 408b may be a male connector, and connector 408a may be a female connector. Connector 408b may be designed to be connected to female connectors similar to connector 408a, and connector 408a may be designed to be connected to male connectors similar to connector 408b.

In some electrical systems employing connectors similar to connectors 408a and 408b, faulty connectors may lead to a faulty electrical connection, which may cause arcing and/or overheating of the connectors. Excess heat may spread for the connectors to the conductors they are coupled to. In some systems, failure to detect gradual overheating of connectors and/or conductors may cause conductor insulation to catch fire, and significant damage and/or dangerous situations may ensue.

Output conductors 404a and 404b may be of appropriate length for connecting a plurality of power devices such as 400 when deployed in an electrical installation. For example, power device 400 may be designed to be a photovoltaic (PV) module or to be coupled to a different PV module (e.g. a PV generator), and a plurality of power devices similar to or the same as power device 400 may be coupled in series or in parallel to form a photovoltaic string carrying the power from a plurality of PV modules. In some embodiments, coupled power devices such as 400 may be deployed a certain distance apart from each other. For example, in some embodiments, adjacent power devices may be deployed 1 meter or 2 meters apart from one another. In some embodiments, each power device may comprise output conductors of about equal length, where the sum of the lengths of the conductors is about the same as the distance between the power devices. For example, if two power devices (e.g. devices such as power device 400) are deployed about 1 meter apart, each device may comprise two output cables of about 0.5 meters each, so that the male connector of one device's output conductors may be coupled to the female connector of the other device's output conductors.

In some photovoltaic systems, detecting an increasing temperature at connection points may be difficult due to significant distances between system temperature sensors and connection point locations. For example, common PV power devices include cables between around 50 [cm] and around 100 [cm] long. When two PV power devices are coupled, the connector location may be between 50 [cm] and 100 [cm] from a temperature sensor deployed in the PV power device, which might be too great a distance for effective detection of overheating at the connector location. In some embodiments, enhanced overheating detection may be obtained by designed connector locations to be close to a temperature sensor in the PV power device.

In the illustrative embodiment of FIG. 4, output conductor 404a is illustratively significantly shorter than output conductor 404b. As a numerical example, output conductor 404a may be 0.2 meters long, and output conductor 404b may be 0.8 meters long. When power devices featuring asymmetrically sized output conductors are coupled to each other, the connection point between the conductors may be closer to one device than the other. As a numerical example, if output conductor 404a is 0.2 meters long, and output conductor 404b is 0.8 meters long, when two power devices (e.g. devices such as power device 400) are coupled to one another, the connection location will be about 0.8 meters from one power device and 0.2 meters from the other power device. If one output conductor is very short and the other is very long, the connection location may be close enough to circuitry (e.g. temperature sensor 401) for the circuitry to detect an increase in heat at the connection point. In some embodiments, a thermocouple or LHD device may be deployed alongside an electrical conductor and integrated in input or output conductors (e.g. conductors 403, 404a and/or 404b) and coupled to a controller and/or communication device deployed in circuitry 402 to detect overheating at any point along the conductor.

Figure 5:
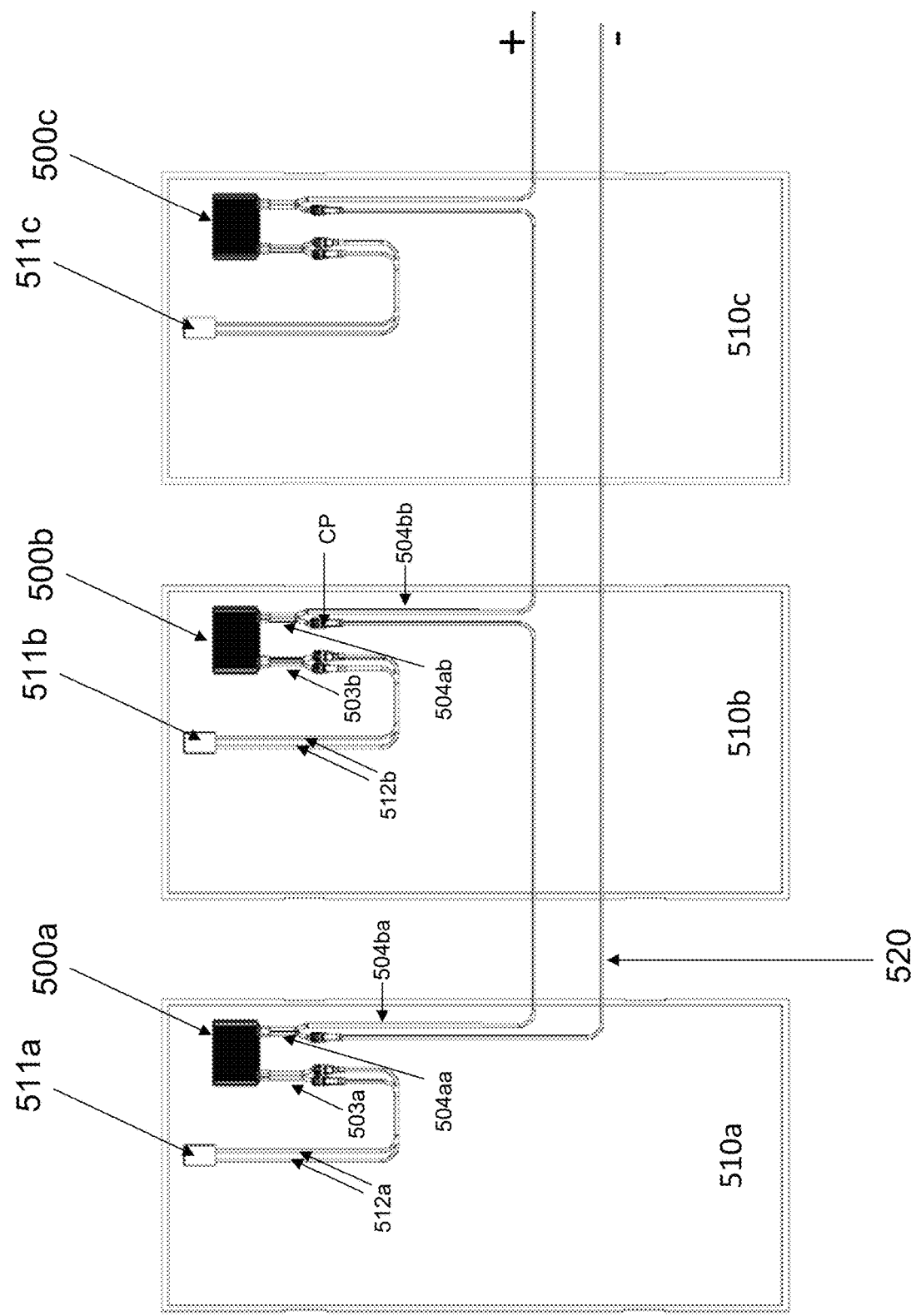
FIG. 5 illustrates a portion of a photovoltaic string according to one or more illustrative aspects of the disclosure.

Reference is now made to FIG. 5, which illustrates a portion of a photovoltaic generation system according to aspects of illustrative embodiments. PV panels 510a, 510b and 510c may be part of a serial PV string. A PV panel may comprise a junction box (e.g. PV panel 510a comprises junction box 511a) designed to receive electrical power from PV cells (not explicitly illustrated, as PV cells are generally deployed on the opposite side of the panel as the junction box). Conductors may carry power output from the junction box. In some embodiments, power devices may be coupled to photovoltaic panels for monitoring and/or controlling the power output by the panels or for other operational or safety purposes. For example, power devices 500a and 500b may be coupled to PV panels 510a and 510b, respectively. Power devices (e.g. power devices 500a, 500b and 500c) may be coupled in series, to form a serial PV string. Conductor 520 may be coupled to the low-voltage output conductor terminal of power device coupled to the first panel in the string (in this illustrative embodiment, power device 500a coupled to PV panel 510a), and may form the lower-voltage string line. A higher-voltage string line may be formed by serially connecting the rest of the output conductors of the power devices comprising the string. The lower-voltage and higher-voltage string lines may be designed to be input to an appropriate device, for example, a direct-current (DC) combiner box, battery charging circuit or PV inverter designed to convert DC power produced by the PV panels to alternating-current (AC) power for consumption by a load (e.g. a home, grid or battery).

In the illustrative embodiment shown in FIG. 5, power device 500a is coupled to PV panel 510a. Power device 500a receives power from panel conductors 512a via input conductors 503a. Power device 500a outputs power via output conductors 504aa and 504ba. Similarly, power device 500b is coupled to PV panel 510b. Power device

500*b* receives power from panel conductors 512*b* via input conductors 503*b*. Power device 500*a* outputs power via output conductors 504*ab* and 504*bb*. Output conductors 504*ba* and 504*ab* are connected at connection point CP, which may be adjacent to power device 500*b*. If the connection between output conductors 504*ba* and 504*ab* at is faulty, the temperature at connection point CP may increase, and may be detected by a temperature sensor comprised by power device 500*b* (e.g. a sensor similar to or the same as sensors 201, 210 or 410 as described herein). Multiple power device may be coupled to one another in a similar manner, enabling connecting points to be adjacent to power devices configured to detect increases in temperature.

In some embodiments, some or all of the power device input and/or output conductors may include thermal devices designed to respond to or measure rising temperatures. For example, in some embodiments, some or all of the system conductors may include thermocouple wires deployed alongside conductors designed to carry the electrical power. In some embodiments, each system conductor may include a thermocouple wire connected to a sensor in a power device (e.g. power device 500*a*), enabling the power device to sense a rise in temperature at any point along the conductor. In some embodiments, costs may be reduced by deploying thermocouple wires only in short conductors (e.g. input conductors 503*a*, 503*b* and output conductors 504*aa*, 504*ab*). In some embodiments, each system conductor may include a Linear Heat Detector (LHD) coupled to a controller in a power device (e.g. power device 500*a*). In some embodiments, a rise in temperature at any point along the conductor may cause the LHD wires to come into contact with one another, triggering an electrical pulse that may be detected by a controller configured to take action in response to receiving a pulse. In some embodiments, costs may be reduced by deploying LHD wires only in short conductors (e.g. input conductors 503*a*, 503*b* and output conductors 504*aa*, 504*ab*).

FIG. 5 illustrates a system comprising add-on power devices coupled to PV panels. In some embodiments, some or all of the power device functionalities may be embedded into a PV panel junction box.

Figure 6:
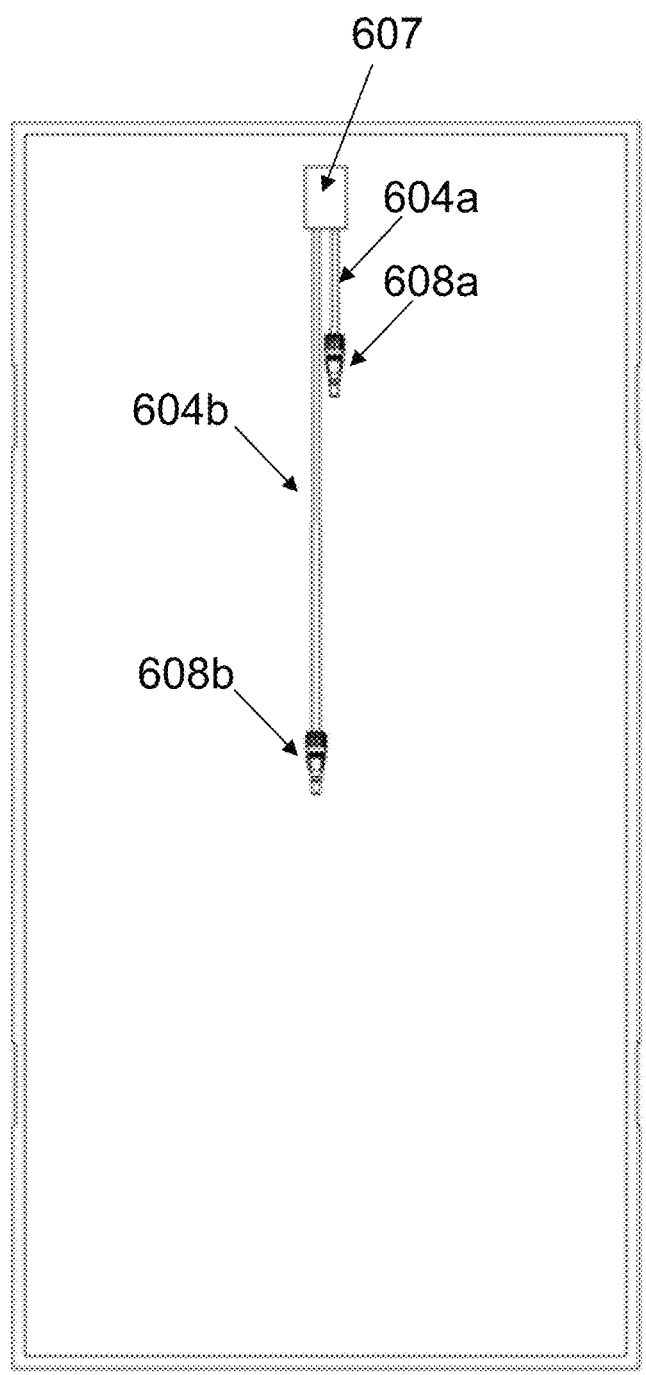
FIG. 6 illustrates a photovoltaic panel according to one or more illustrative aspects of the disclosure.

Reference is now made to FIG. 6, which illustrates an integrated photovoltaic panel according to illustrative embodiments. PV panel 610 comprises PV cells (not explicitly depicted) and junction box 607, configured to receive power from the PV cells. Junction box 607 may feature an integrated power device comprise some or all of the functional elements described herein with regard to illustrative power devices (e.g. some or all of the elements of circuitry 302 described with regard to FIG. 3). For example, junction box 607 may comprise a temperature sensor similar to or the same as sensors 201 and 210, a controller similar to or the same as control device 305, and a safety device such as switches (e.g. Metal Oxide Silicon Field Effect Transistors (MOSFETs), Insulated-Gate Bipolar Transistors (IGBTs), Bipolar Junction Transistors (BJTs), electro-mechanical or solid-state relays, etc.) configured to disconnect output conductors 604*a* and 604*b*. In some embodiments, junction box 607 may include a power converter, communication device and MPPT circuit which are similar to or the same as power converter 300, communication device 303 and MPPT circuit 306, respectively. Output conductors 604*a* and 604*b* may be designed to carry the electrical power output from junction box 607, and may be fastened to connectors 608*a* and 608*b*, respectively. Many common photovoltaic panels feature output conductors which are about the same length, and may be of an appropriate length for adjacent PV panels to be connected to each other. In some embodiments of the current disclosure, such as in the embodiment shown in FIG. 6, one conductor may be longer than the other. For example, output conductor 604*b* may be significantly longer than output conductor 604*a*. As a numerical example, output conductor 604*b* may be about 1.8 meters long, and output conductor 604*a* may be about 0.2 meters long.

Figure 7:
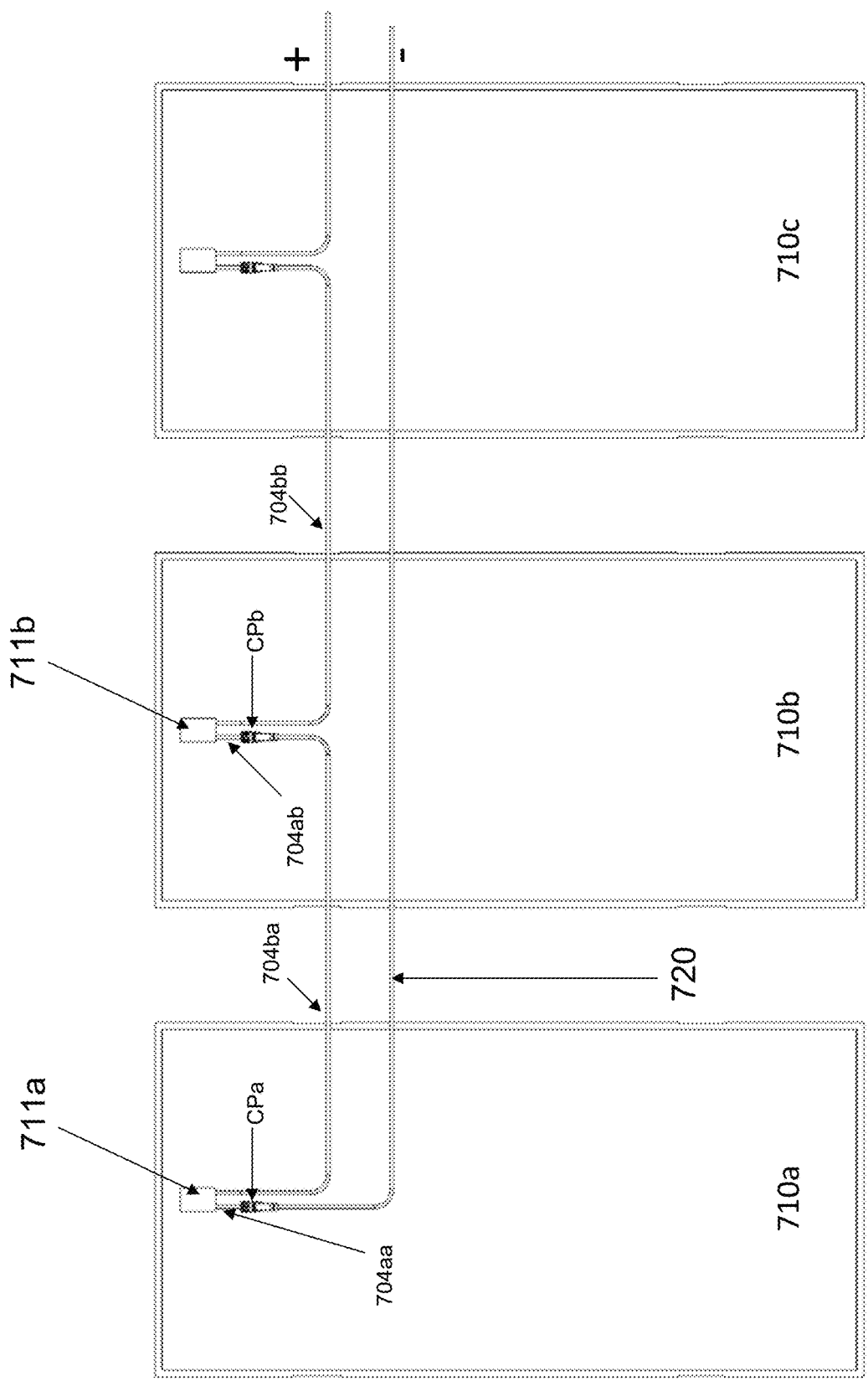
FIG. 7 illustrated a portion of a photovoltaic string according to one or more illustrative aspects of the disclosure.

Connecting PV panels using asymmetrical conductors may, in some embodiments, increase the likelihood of detecting a rise in temperature due to a faulty connection. Reference is now made to FIG. 7, which shows a portion of a PV string according to illustrative embodiments. PV panels 710*a*, 710*b* and 710*c* may be serially connected to form part of a PV string. A PV panel may comprise a junction box (e.g. PV panel 710*a* comprises junction box 711*a*) designed to receive electrical power from PV cells (not explicitly illustrated, as PV cells are generally deployed on the opposite side of the panel as the junction box). Conductors may carry power output from the junction box. Conductor 720 may be coupled to the low-voltage output conductor of the first panel in the string (in this illustrative embodiment, PV panel 710*a*), and may form the lower-voltage string line. A higher-voltage string line may be formed by serially connecting the rest of the output conductors of the PV panels comprising the string. The lower-voltage and higher-voltage string lines may be designed to be input to an appropriate device a direct-current (DC) combiner box, MPPT circuit, battery charging circuit or PV inverter designed to convert DC power produced by the PV panels to alternating-current (AC) power for consumption by a load (e.g. a home, grid or battery).

In the illustrative embodiment shown in FIG. 7, PV panel 710*a* is coupled to PV panel 710*b*. Conductor 720 may be coupled to the lower-voltage conductor 704*aa* of panel 710*a* at connection point CPa. PV panel 710*a* may be coupled to PV panel 710*b* by connecting output conductor 704*ba* of panel 710*a* to output conductor 704*ab* of panel 710*b* at connection point CPb. If the connection between output conductors 704*ba* and 704*ab* at is faulty, the temperature at connection point CPb may increase, and may be detected by a temperature sensor disposed in junction box 711*b* (e.g. a sensor similar to or the same as sensors 201, 210 or 410 as described herein). Multiple PV panels may be coupled to one another in a similar manner, enabling connecting points to be adjacent to PV panels configured to detect increases in temperature.

In some embodiments, some or all of the PV panel output conductors may include thermal devices designed to respond to or measure rising temperatures. For example, in some embodiments, some or all of the output conductors may include thermocouple wires deployed alongside conductors designed to carry the electrical power. In some embodiments, each system conductor may include a thermocouple wire connected to a sensor in a junction box (e.g. junction box 711*a*), enabling the sensor to sense a rise in temperature at any point along the conductor. In some embodiments, costs may be reduced by deploying thermocouple wires only in short conductors (e.g. output conductors 704*aa*, 704*ab*). In some embodiments, each system conductor may include a Linear Heat Detection (LHD) coupled to a controller in a junction box (e.g. junction box 711*a*). In some embodiments, a rise in temperature at any point along the conductor may cause the LHD wires to come into contact with one another, triggering an electrical pulse that may be detected by a controller configured to take action in response to receiving a pulse. In some embodiments, costs may be reduced by deploying LHD wires only in short conductors (e.g. output conductors 704*aa*, 704*ab*).

Figure 8A:
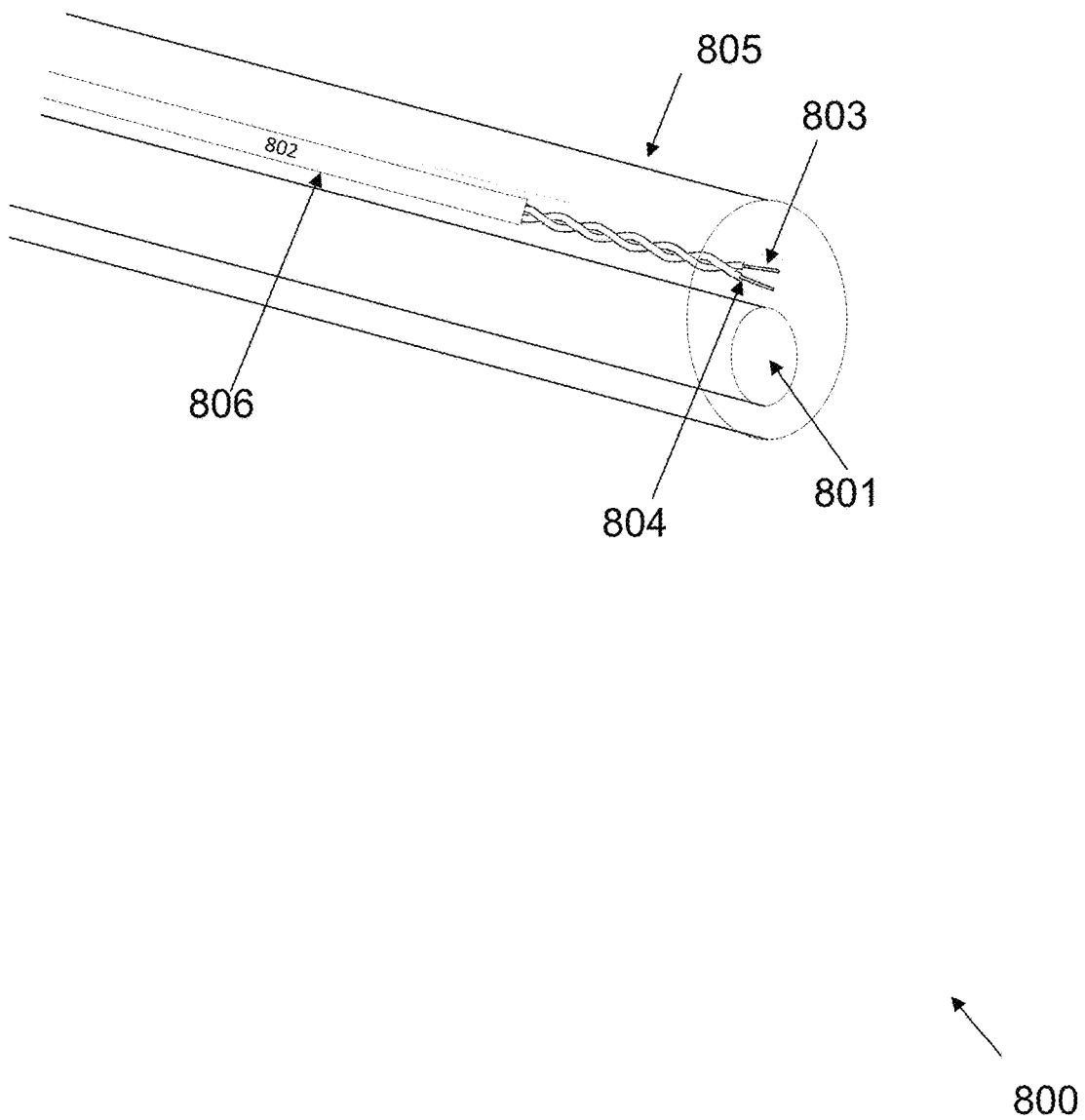
FIG. 8A depicts an integrated heat-detecting electrical conductor according to one or more illustrative aspects of the disclosure.

Reference is now made to FIG. 8A, which illustrates an integrated electrical cable according to illustrative embodiments. Integrated cable 800 may comprise conductor(s) 801 and heat detector 802. Conductor(s) 801 may be made of copper, aluminum or other appropriate conducting materials. In the illustrative embodiment of FIG. 8A, conductor(s) 801 is illustrated having a single conductor. In some embodiments, conductor(s) 801 may comprise several separate conductors (e.g. 2, 3, 4, 5, 10, 20 or even 40 conductors), each made of an appropriate conducting material. Heat detector 802 may comprise wires 803 and 804. In some embodiments, wires 803 and 804 may be wound together to form a thermocouple pair configured to measure temperature at a contact point. For example, the ends of wires 803 and 804 may be coupled at a connection point in a PV string, with a temperature sensor located in a power device (e.g. temperature sensor 401 of power device 400) or a PV junction box (e.g. junction box 711*a*) measuring the temperature at the contact point via the thermocouple pair. If a temperature above a certain threshold is measured, a controller and/or communication device coupled to the sensor may take action (e.g. reporting a potentially dangerous situation or disconnecting a circuit) in accordance with embodiments disclosed herein.

Still referring to FIG. 8A, in some embodiments, heat detector 802 may be a Linear Heat Detector (LHD). Wires 803 and 804 may be insulated, with the insulation designed to melt at a certain temperature, creating an electrical contact between wires 803 and 804. For example, the insulation between wires 803 and 804 may be designed to melt at a threshold temperature set with regard to criteria described herein. Common LHD devices feature insulation designed to melt at about 90° C., 105° C., 135° C. and 180° C. In case of overheating at any point in integrated cable 800, a local temperature may rise above the threshold temperature, bringing wires 803 and 804 into electrical contact which may create a short-circuit. Wires 803 and 804 may be coupled to a power device (e.g. temperature sensor 401 of power device 400) or a PV junction box (e.g. junction box 711*a*) comprising circuitry designed to detect a short-circuit, and upon detection, a controller and/or communication device coupled may take action (e.g. reporting a potentially dangerous situation or disconnecting a circuit) in accordance with embodiments disclosed herein.

In some illustrative embodiments, wires 803 and 804 may be enclosed in insulation 806, creating additional separation and isolation from conductor(s) 801. In some embodiments, additional insulation might not be necessary. Integrated cable 800 may include casing 805, which encloses conductor(s) 801 and heat detector 802 for fast and easy deployment.

In some embodiments, heat detector 802 may comprise a thermistor or resistance thermometer coupled in series to a single wire, with the wire resistance measured periodically to detect a change in resistance which may be indicative of overheating. The wire resistance may be measured in various ways, such as applying a voltage between the wire ends and measuring current.

Integrated cables similar to or the same as integrated cable 800 may be used in various systems. In some embodiments, PV panels or other power sources may comprise one or more integrated cable(s) providing electrical connection along with heat-detecting capabilities. For example, a PV panel (e.g. PV panel 610) may include an output conductor (e.g. output conductor 604*b*) which may be a "regular" conductor, and one output conductor (e.g. output conductor 604*a*) comprising an integrated cable such as or similar to integrated cable 800. In some embodiments, PV power-devices (e.g. power device 400) may comprise one or more integrated cables. For example, a PV power device (e.g. power device 400) may feature one output conductor (e.g. output conductor 404*b*) which may be a "regular" conductor, and one output conductor (e.g. output conductor 404*a*) comprising an integrated cable similar to or the same as integrated cable 800. In some embodiments, a PV power device may have one or more input conductors (e.g. input conductors 403) comprise an integrated cable. In some embodiments, integrated cables may be deployed in homes, factories, shopping malls or in any other electrical system where heat-detecting capabilities may enhance electrical safety. Integrated cables may be deployed in particularly sensitive parts of electrical systems, or more broadly across entire systems.

Figure 8B:
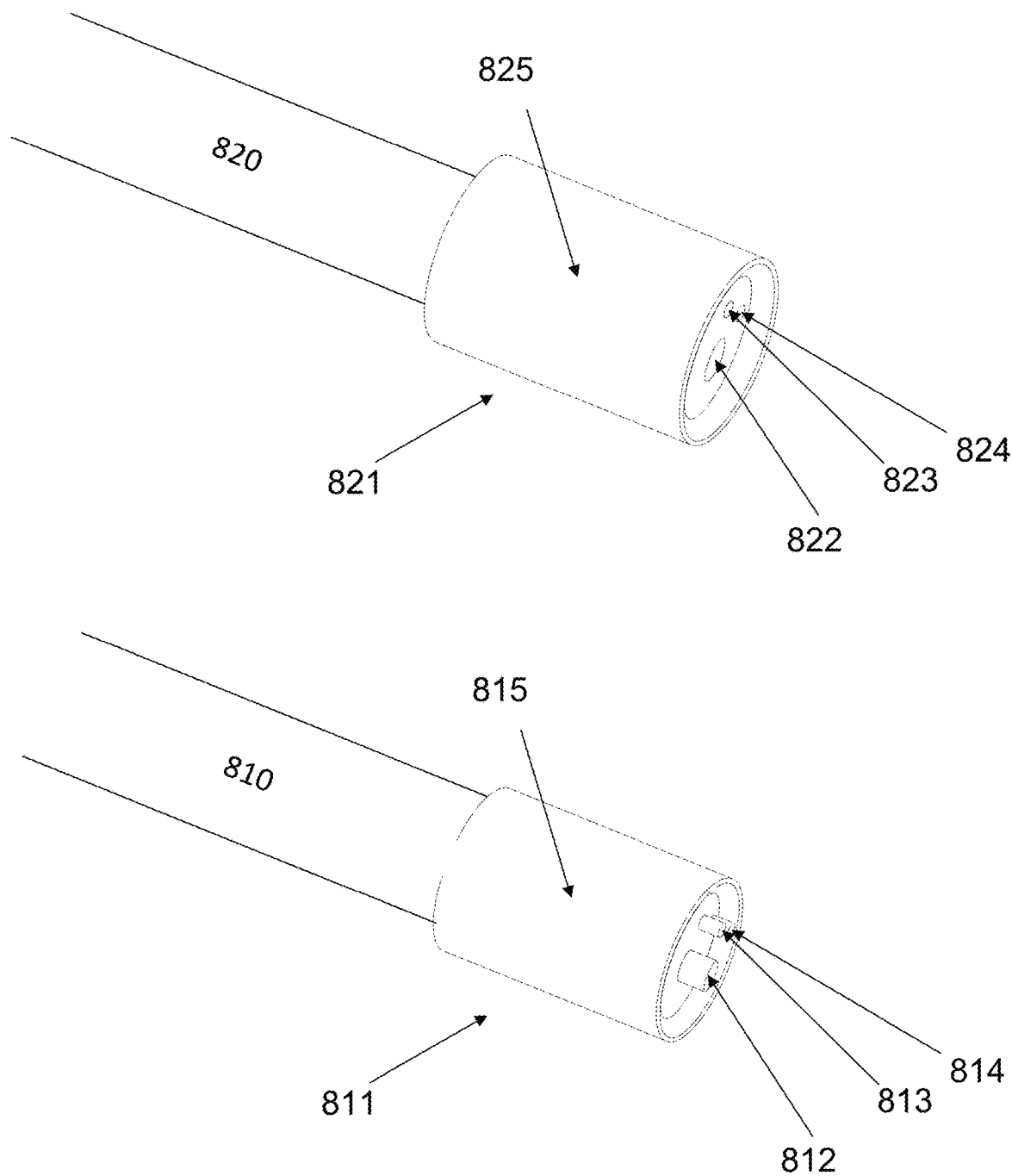
FIG. 8B depicts integrated heat-detecting electrical connectors according to one or more illustrative aspects of the disclosure.

Reference is now made to FIG. 8B, which illustrates integrated heat-detecting electrical connectors according to one or more illustrative aspects of the disclosure. Integrated connector 811 may comprise outer section 815, conductor pin 812 and temperature-device pins 813 and 814. In some embodiments, integrated cable 810 may be coupled to integrated connector 811. Integrated cable 810 may be similar to or the same as integrated cable 800 of FIG. 8A, with a conductor similar to or the same as conductor(s) 801 coupled to conductor pin 812, and wires similar to or the same as wires 803 and 804 coupled to temperature-device pins 813 and 814. In some embodiments, a connector similar to or the same as integrated connector 811 may be part of an electrical device, such as a PV power device (e.g. a DC/DC converter or a DC/AC inverter), with conductor pin 812 carrying input current into or out of the electrical device, and temperature-device pins 813 and 814 coupled to an appropriate control device.

Still referring to FIG. 8B, integrated connector 821 may comprise outer section 825, conductor cavity 822 and temperature-device cavities 823 and 824. In some embodiments, integrated cable 820 may be coupled to integrated connector 821. Integrated cable 820 may be similar to or the same as integrated cable 800 of FIG. 8A, with a conductor similar to or the same as conductor(s) 801 coupled to conductor cavity 822, and wires similar to or the same as wires 803 and 804 coupled to temperature-device cavities 823 and 824. In some embodiments, a connector similar to or the same as integrated connector 821 may be part of an electrical device, such as a PV power device (e.g. a DC/DC converter or a DC/AC inverter), with conductor cavity 822 carrying input current into or out of the electrical device, and temperature-device cavities 823 and 824 coupled to an appropriate control device.

Integrated connectors 811 and 821 may be designed to fit together for connecting to each other. Conductor pin 812 may be designed to fit into conductor cavity 822, and temperature-device pins 813 and 814 may be designed to fit into temperature-device cavities 823 and 824. When integrated connectors similar to or the same as integrated connectors 811 and 821 are connected to one another, their respective conducting and temperature detecting elements may be coupled to one another, for serial stringing of the conducting and temperature detecting elements.

Referring back to FIG. 7, in some embodiments, connection points CPa and CPb may comprise integrated connectors similar to or the same as integrated connectors 811 and 821. Conductor 720 and/or conductors 704*aa*, 704*ba*, 704*ab*, and 704*bb* may be similar to or the same as integrated cable 800. In some embodiments, a (not explicitly depicted in FIG. 7) system control device may be part of an electrical device (e.g. a DC/DC converter, a DC/AC inverter, and/or a photovoltaic combiner box used to couple multiple photovoltaic strings in parallel) coupled between the higher-voltage and lower-voltage power lines. Connecting the integrated cables (e.g. conductors 720, 704aa, 704ba, 704ab, and 704bb) using integrated connectors may couple thermal devices (e.g. thermocouple, LHD) may enable the system control device to detect overheating at any point in the portion of a PV string depicted in FIG. 7 without requiring deployment of a controller in multiple locations.

Figure 9:
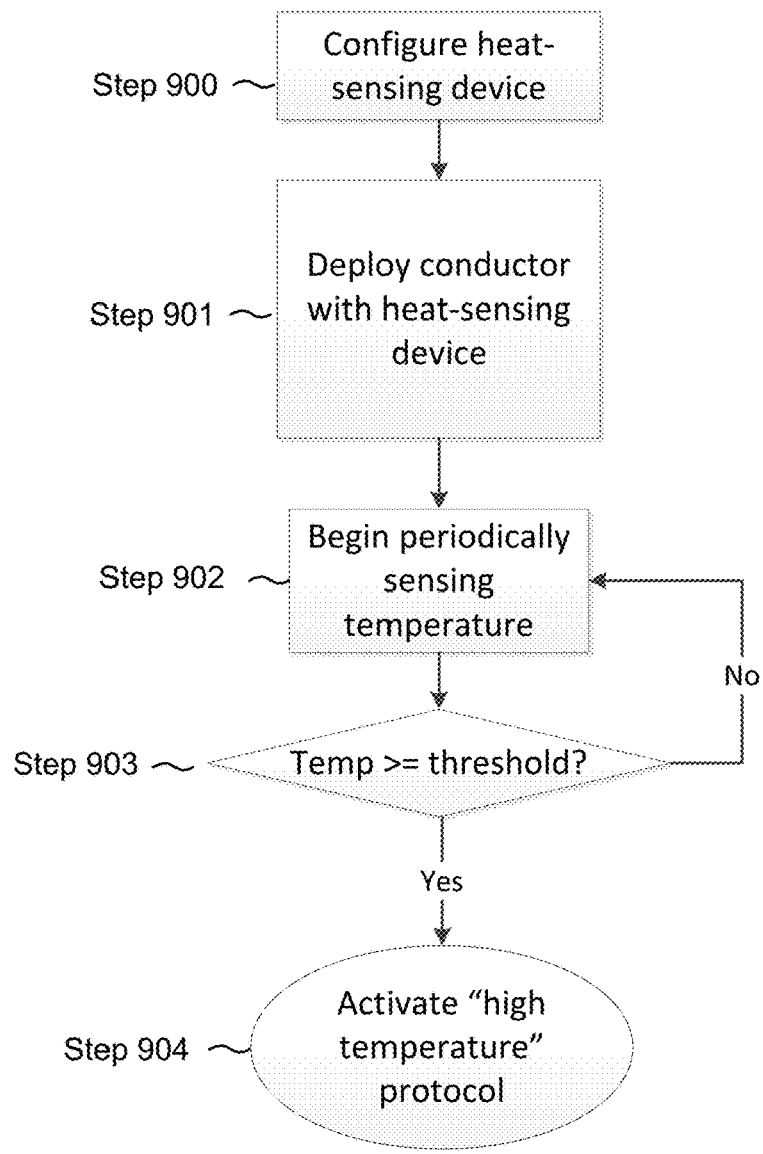
FIG. 9 is a flow diagram of a method for detecting overheating in an electrical conductor according to one or more illustrative aspects of the disclosure.

Reference is now made to FIG. 9, which shows a flow diagram of a method for detecting overheating in an electrical conductor according to one or more illustrative aspects of the disclosure. At step 900, a heat-sensing device is configured. The heat sensing-device may be a thermocouple, LHD or similar heat-detection device. Configuring the heat-sensing device may include one or more design steps. For example, if the heat-detection device is an LHD, configuring the device may include selecting insulation which melts at an appropriate temperature. If the heat-detection device is thermocouple device, configuring the device may include coupling the device to a controller and setting a threshold temperature which the controller may interpret as a potentially unsafe temperature. At step 901, the heat-sensing device may be deployed along with a conductor, in an integrated cable similar to or the same as integrated cable 800. Deploying the device may comprise physically connecting an integrated cable to other system devices, as part of construction of an electrical system such as a PV installation. Steps 902-904 may be similar to or the same as steps 102-104 of FIG. 1.

In some embodiments, it may be desirable to log temperature measurements during "normal" system operation, both to provide real-time operating information and to predict future system events. For example, referring back to FIG. 3, circuitry 302 may comprise a sensor 301 coupled over common bus 320 to memory device 309, communication device 303 and control device 305. The measurements measured by sensor 301 may be stored on memory device 309, processed by control device 305 and/or communicated to external memory or control devices via communication device 303. The measurements taken by sensor 301 and/or sensors/sensor interfaces 304 may be analyzed by one or more control/processing devices for statistical patterns which may enable early detection or prediction of potentially dangerous situations. Measurements taken by many sensors deployed in many devices may generate a large database of measurements. In some cases, measurements obtained from a system which later experienced an unsafe condition may be analyzed to detect trends which may be exhibited in similar systems and may be indicative of an upcoming unsafe condition.

A myriad of predictive modeling and/or detection techniques may be used to detect or predict unsafe conditions resulting from rising or high conductor temperature. A partial list includes Bayesian analysis, Machine Learning, Artificial Neural Networks (ANN), Regression Analysis and Maximum a-posteriori (MAP) testing. For example, in some embodiments, a linear regression may be used to model the relationship between temperature at a conductor location and other measurable system variables such as temperatures measured at other system locations, voltage and current levels, current harmonic content, solar irradiance and/or ambient humidity levels. In some embodiments, an ANN may be trained to emulate a nonlinear function and identify an upcoming instance of conductor overheating by being trained using historical system data measured prior to system safety events (e.g. overheating, fires, etc.).

As an illustrative, non-limiting example, historical data may suggest that if a temperature measured by a temperature sensor deployed 20 [cm] or less from a connection point is above 1000 for 10 [sec] or longer, and temperature is rising at a rate of 1° C./sec or higher and the current flowing through the connection point is 10[A] or higher, there is a significant probability of the connection point overheating and a fire starting. The actual thresholds may vary from system to system, and those given above are illustrative examples.

Figure 10:
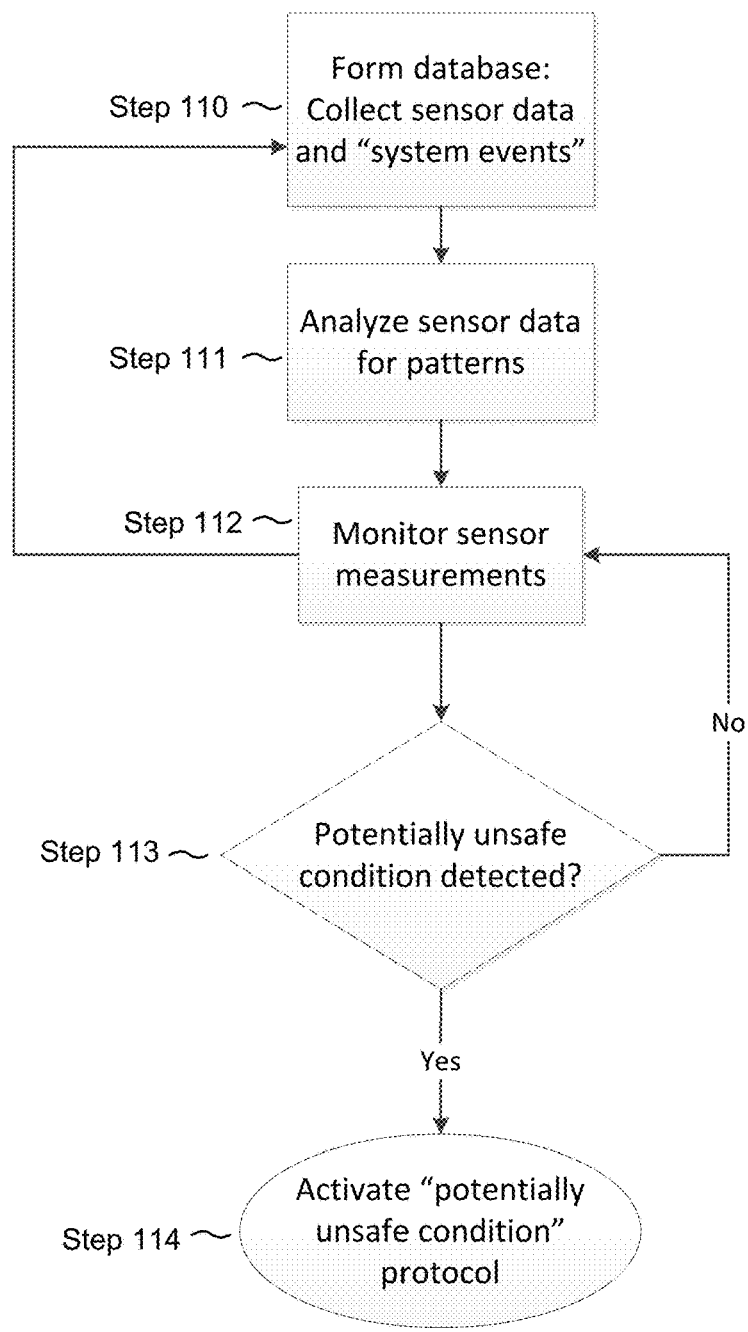
FIG. 10 is a flow diagram of a method for predicting a potentially unsafe condition according to one or more illustrative aspects of the disclosure.

Reference is now made to FIG. 10, which shows a flowchart according to an aspect of illustrative embodiments. At step 110, data may be collected from sensors, and "system events" may be logged. Step 110 may take place over a period of time such as a day, month, year or several years. In some embodiments, step 110 may comprise purchasing data from a database. Sensor data may include (but is not limited to) measurements measured by voltage sensors, current sensors, irradiance sensors, temperature sensors, humidity sensors, and/or wind sensors. System events may include periods of normal, safe operating conditions, and may also include (but are not limited to) unsafe conditions such as arcing, overheating, fires, system failure and/or short-circuit conditions. At step 111, the data may be analyzed for patterns, using pattern recognition methods designed to correlate groups of data measurements with certain system events. Pattern recognition methods may include supervised and unsupervised learning methods, and may include various families of statistical and/or machine learning techniques.

At step 112, the method begins monitoring system sensor measurements. Measurements may be interpreted with regard to the patterns detected at step 111. In some embodiments, the method may proceed to step 113 each time a new sample is received, and in some embodiments may proceed to step 113 at regular time intervals, or after a series of samples is received. In some embodiments, measurements obtained at step 112 may be added to the system database, and the method may periodically return to steps 110-111, adding recent samples to the collection of sensor data and iteratively analyzing the collection of sensor data for recognizing patterns.

At step 113, the method may evaluate the system state based on previous measurements and a model developed for characterizing the system. For example, the method may determine that a temperature measurement of 100° C. measured by a temperature sensor (e.g. temperature sensor 401 or FIG. 4) indicates that the system may be in a potentially unsafe condition. As another example related to the illustrative embodiment illustrated in FIG. 4, the method may determine that a temperature measurement of 90° C. by temperature sensor 401, in combination with a previous temperature measurement of 85° C. by sensor and a current measurement of 10[A] flowing through connector 408a (measured by, for example, a current sensor comprising circuitry 402) may indicate a potentially unsafe connection between connector 408a and a corresponding connector.

If, at step 113, the system is determined to be operating safely, the method may return to step 112 for continued monitoring of sensor measurements. If a potentially unsafe condition is detected at step 113, the method may proceed to step 114. At step 114, a "potentially unsafe condition" protocol may be followed. In some embodiments, the "potentially unsafe condition" protocol may comprise a controller automatically disconnecting a portion of the system from an electrical current. In some embodiments, the controller may be coupled via a communication device to a wired and/or wireless network(s)/Internet/Intranet, and/or any number of end user device(s) such as a computer, smart phone, tablet and/or other devices such as servers which may be located at a network operations center and/or monitoring center. These devices may be utilized to generate a warning of a dangerous condition, determine when a dangerous condition is probable, detect the type of dangerous condition and/or take action to degrade or turn off certain portions a system. These warnings can be audio and/or visual. They may, for example, be a beep, tone, siren, LED, and/or high lumen LED.

The method illustrated in FIG. 10 may be carried out by one or more control devices, either local or remote, with data-sharing and communication taking place between various control devices.

Figure 11:
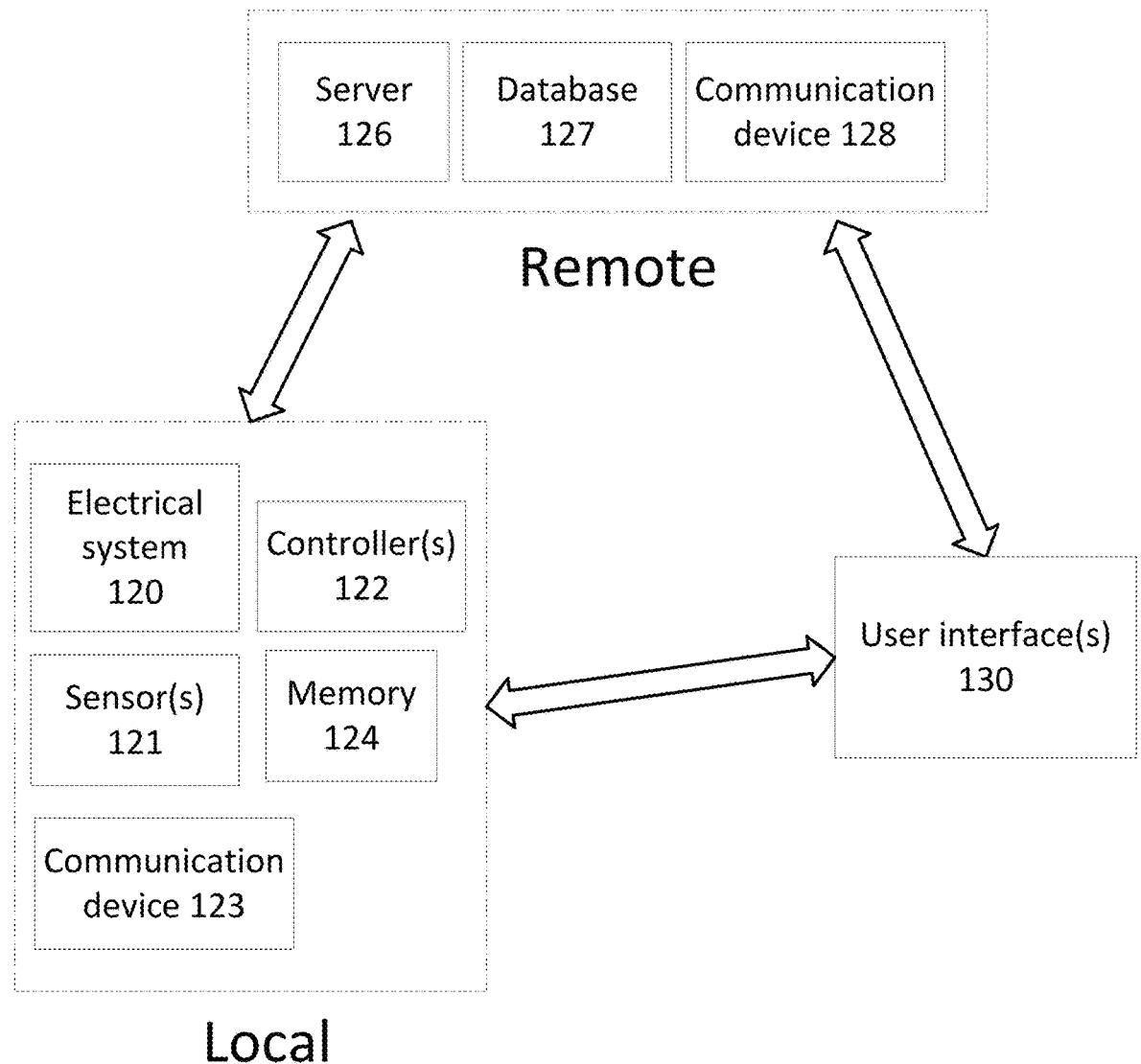
FIG. 11 is a block diagram of an illustrative distributed system for carrying out some of the illustrative methods according to aspects of the disclosure.

Reference is now made to FIG. 11, which illustrates a system control architecture according to an illustrative embodiment. Local electrical system 120 may be coupled to sensors/sensor interfaces 121, controller(s) 122, communication device 123 and local memory device 124. Interaction between the various local system devices may be similar to described above with regard to previously disclosed embodiments. Server 126, database 127 and communication device 128 may be remotely located, e.g. at a management, monitoring or command and control center. Communication devices 128 and 123 may be configured to communicate using wired or wireless communication methods, such as cellular communication, or using Power Line Communications. In some embodiments, the steps of the method of FIG. 10 are carried out solely by local controller(s) 122, and in some embodiments, the steps are carried out by both local controller(s) 122 and remote devices. For example, in some embodiments, steps 110 may be carried out by purchasing data and storing the data on database 127, step 111 may be carried out by server 126, step 112 may be carried out by local sensors/sensor interfaces 121 and controller(s) 122, step 113 may be carried out by server 126, and step 114 may be carried out by controller(s) 122. In some embodiments, step 110 may be carried out by sensors/sensor interfaces 121 taking measurements over time, and transferring the data to database 127 via communication devices 128 and 123. In some embodiments, at step 114, communication device 128 may send a warning to user interface(s) 130, reporting a potentially unsafe condition. In some embodiments, the entire method (steps 110-114) may be carried out by local devices.

In the illustrative embodiments disclosed herein, photovoltaic panels are used to exemplify energy sources which may make use of the novel features disclosed. In some embodiments, the energy sources may include solar shingles, batteries, wind or hydroelectric turbines, fuel cells or other energy sources in addition to or instead of photovoltaic panels. The temperature detection methods, prediction techniques and other techniques disclosed herein may be applied to alternative energy sources such as those listed above, and the nearly exclusive mentioning of photovoltaic generators as energy sources is not intended to be limiting in this respect.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, integrated cable 800 of FIG. 8A may be used as an output conductor 404a of power device 400 or as output conductor 604a of PV panel 610. As another example, the architecture illustrated in FIG. 11 and described with regard to the method of FIG. 10 may also be used to implement all or part of the method of FIG. 1.

Figure 12:
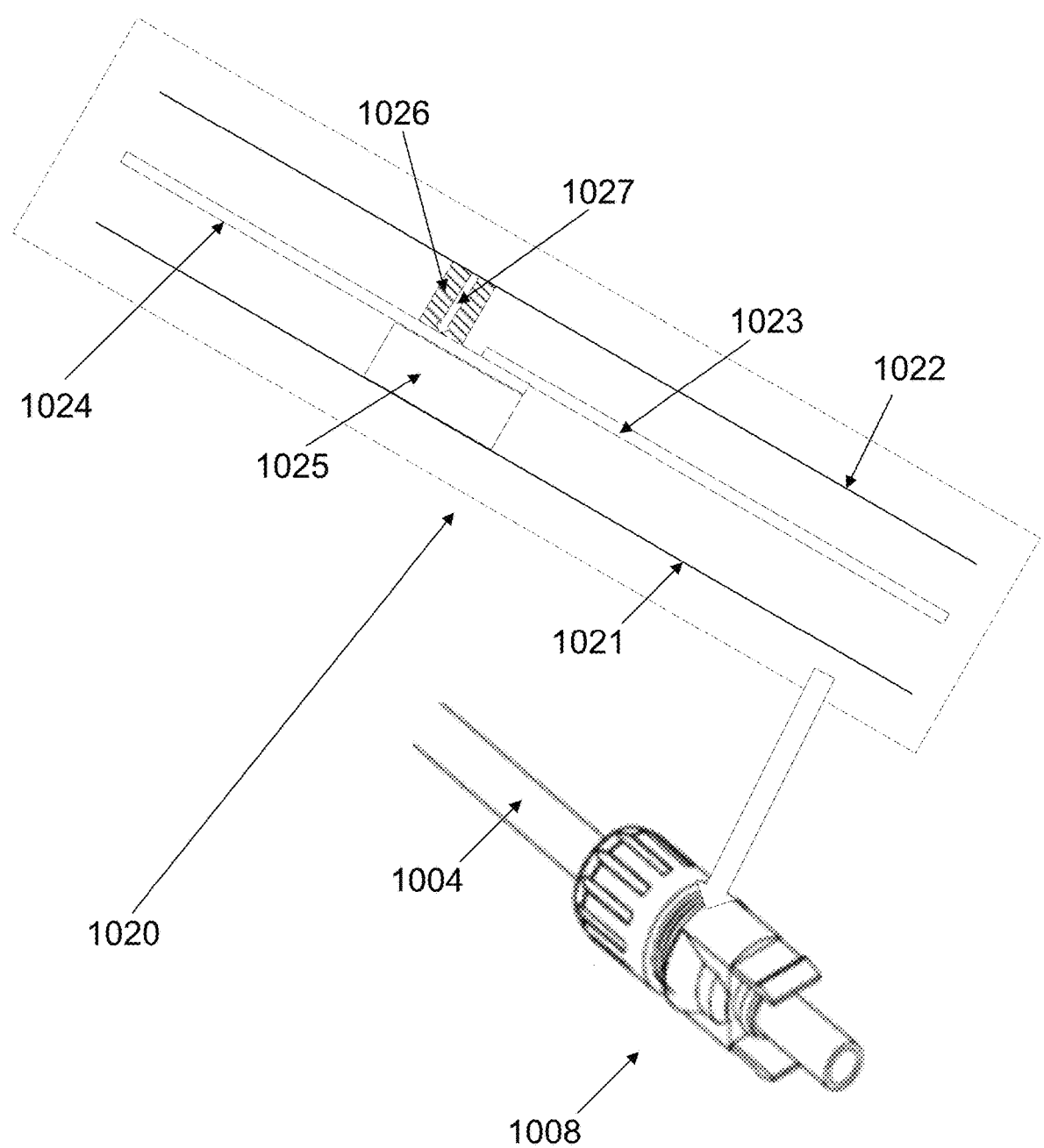
FIG. 12 depicts an integrated heat-detecting electrical connector according to one or more illustrative aspects of the disclosure.

Reference is now made to FIG. 12, which illustrates an integrated thermal fuse 1020 according to aspects of illustrative embodiments. Integrated thermal fuse 1020 may be disposed between walls 1021 and 1022, and may comprise conductor 1023, conductor 1024, pellet 1025 and spring 1026. During normal operating conditions, conductors 1023 and 1024 may be in electrical contact for carrying current in a portion of a photovoltaic installation. Spring 1026 may be compressed between wall 1022 and conductor 1024, and may apply mechanical force to conductor 1024, in the direction indicated by arrow 1027. Pellet 1025 may be disposed between conductor 1024 and wall 1021, preventing or limiting movement of conductor 1024. Walls 1021 and 1022 may be portions of an electrical connector, for example, two sides of connector 1008, which may be the same as or similar to connectors 408a or 408b of FIG. 4. Connector 1008 may be a photovoltaic module connector, for example, a photovoltaic generator connector or a photovoltaic power device connector. In some embodiments, walls 1021 and 1022 may be sides of an electrical conductor such as conductor 1004, which may be the same as or similar to output conductors 404a and 404b of FIG. 4. Pellet 1025 may be conductive or nonconductive, and may be made of various materials or compound material including elements such copper, tin, silver, beryllium, or ferrite. Pellet 1025 may be selected to have a melting temperature in a range appropriate for disconnecting a circuit according to the safety requirements of the installation the fuse is disposed in. For example, in photovoltaic installations where it is desirable to disconnect a circuit in response to a temperature of 200° C. at a connection point, a pellet 1025 which melts or is deformed at approximately 200° C., or in a range around, slightly above or slightly below 200° C., may be used. As discussed with regard to FIG. 1, a different threshold may be selected depending on the flammability of materials near a connection point where thermal fuse 1020 may be deployed. Spring 1026 may similarly be conductive or nonconductive.

If the temperature in or at integrated thermal fuse 1020 reaches a temperature threshold selected to trigger a circuit disconnect, pellet 1025 may melt, break or be disfigured. Upon pellet 1025 melting, breaking or being disfigured, spring 1026 may decompress in the direction indicated by arrow 1027, forcing apart conductors 1023 and 1024, resulting in an open circuit connection.

It is to be understood that many different mechanical constructions of a thermal fuse may be considered for use as part of an integrated thermal fuse. For example, alternative constructions may include a conductive pellet forming part of a current path, the pellet melting at a predetermined threshold temperature and disconnecting the current path. As another example, a conductive spring may form part of a conduction path and may be compressed against a pellet, whereby upon the melting or disfiguration of the pellet, the spring decompresses and springs out of the conduction path. As yet another example, spring 1026 may be extended rather than compressed, with pellet 1025 disposed alongside spring 1026 and preventing compression of spring 1026, wherein under a high temperature, pellet 1025 may break or become deformed, allowing spring 1026 to compress and separate conductors 1023 and 1024. A person skilled in the art may appreciate various alternative constructions encompassed in embodiments described herein with regard to integrating a thermal fuse in a connector or cable for use in a renewable energy production installation.

Figure 13A:
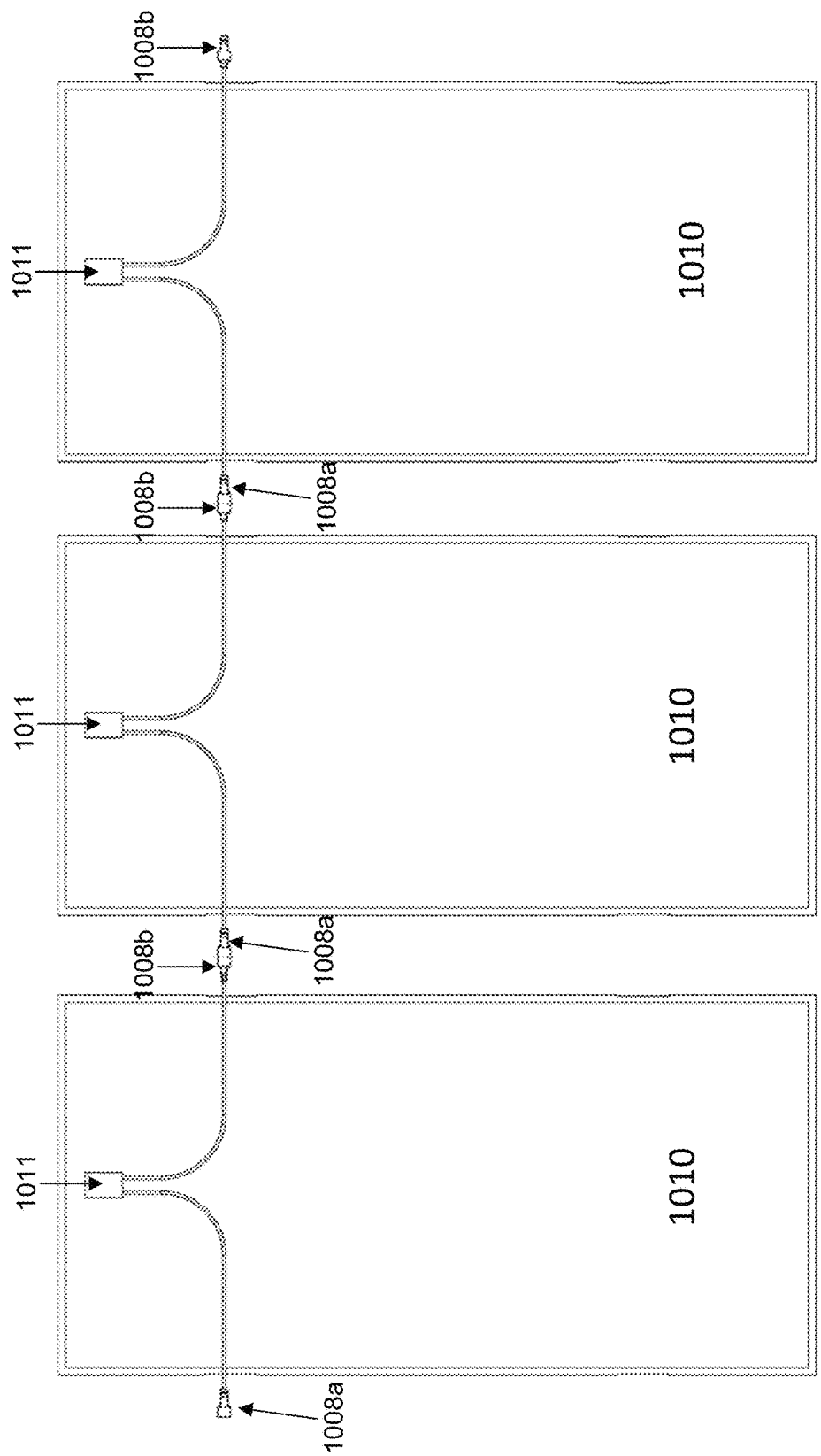
FIG. 13A depicts a portion of a photovoltaic string according to one or more illustrative aspects of the disclosure.

Reference is now made to FIG. 13A, which illustrates a portion of a photovoltaic string according to illustrative embodiments. Photovoltaic generators 1010 may be coupled in series to form a portion of a serial photovoltaic string. Each photovoltaic generator 1010 may comprise junction box 1011, each junction box 1011 comprising a first output conductor terminated by male connector 1008a and a second output conductor terminated by female connector 1008b. Each male connector 1008a may be designed to be connected to a female connector 1008b. In some embodiments, the locations of male connector 1008a and female connector 1008b on a junction box 1011 may be reversed or modified without departing from the scope of the present disclosure. Junction box 1011 may comprise conductors for receiving electrical power from junction box 1011 and outputting the electrical power via the first and second output conductors. In some embodiments, junction box 1011 may comprise a power converter (e.g. a DC-to-DC converter, or a DC-to-AC inverter such as a microinverter), the converter configured to adjust the converter input voltage and/or current to increase power drawn from junction box 1011. In some embodiments, a power converter embedded in junction box 1011 may include a Maximum Power Point Tracking (MPPT) circuit, configured to increase the power produced by junction box 1011. In some embodiments, junction box 1011 may comprise circuitry and/or devices depicted and described in FIG. 3, for example, sensor(s) 304, communication device 303 and/or safety device(s) 307.

Male connector 1008a and/or female connector 1008b may comprise an integrated thermal fuse similar to or the same as integrated thermal fuse 1020. In some embodiments, a thermal fuse may be integrated in a male connector, and in some embodiments, a thermal fuse may be integrated in a female connector, providing an integrated thermal fuse at each male-female connection point. In case of an overtemperature condition (e.g. due to a faulty connection between connectors) at a connection point, the integrated thermal fuse may trip, disconnecting the photovoltaic string and preventing a continuing rise in temperature at the connection point.

Integrating thermal fuses (e.g. integrated thermal fuse 1020) into photovoltaic connectors may increase safety in photovoltaic installations. The number and frequency of fires caused by faulty connectors or a faulty connection may be dramatically reduced by utilizing photovoltaic panels (either with or without junction-box embedded DC-DC or DC-AC converters), photovoltaic converters, batteries and/or other system devices with built-in thermal safety fuses to prevent temperatures from rising above a predetermined threshold such as 200° C.

Figure 13B:
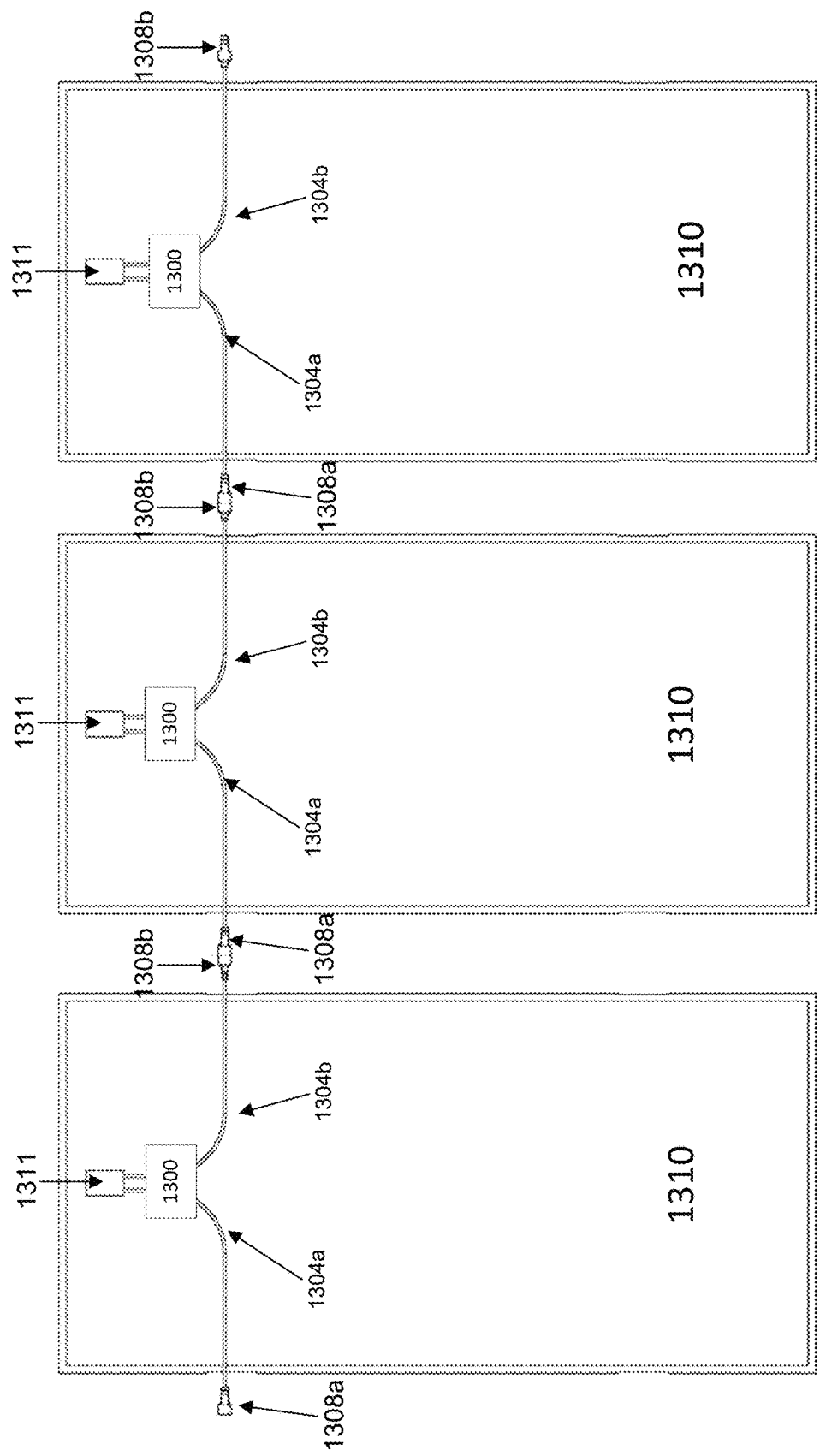
FIG. 13B depicts a portion of a photovoltaic string according to one or more illustrative aspects of the disclosure.

Reference is now made to FIG. 13B, which illustrates a portion of a photovoltaic string according to illustrative embodiments. Photovoltaic generators 1310 and junction boxes 1311 may be similar to or the same as photovoltaic generators 1010 and junction boxes 1011 of FIG. 13A. Photovoltaic power devices 1300 may be similar to or the same as photovoltaic power device 400 of FIG. 4, and may be retrofitted to photovoltaic generators 1011. In some embodiments, photovoltaic power device 1300 may comprise two output conductors 1304a and 1304b, which may be about the same length. Each conductor 1304a may be terminated by a male connector 1308a and each conductor 1304b may be terminated by a female connector 1308b. Each male connector 1308a or each female connector 1308b may be similar to or the same as male connector 1008a and female connector 1008b of FIG. 13A. For example, each male connector 1308a or each female connector 1308b may comprise an integrated thermal fuse designed to respond to an overtemperature condition and disconnect two photovoltaic devices 1300.

Figure 13C:
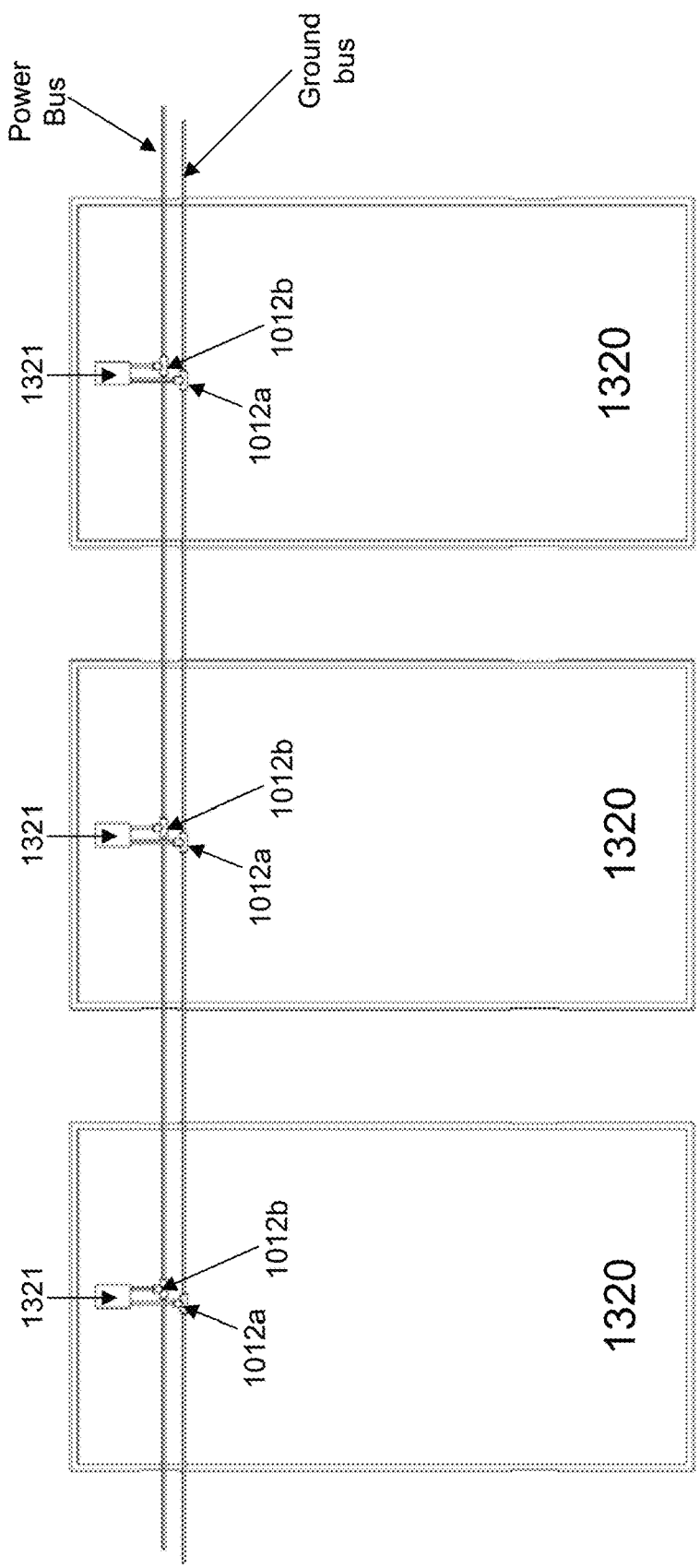
FIG. 13C depicts a portion of a photovoltaic string according to one or more illustrative aspects of the disclosure.

Reference is now made to FIG. 13C, which illustrates a portion of a photovoltaic string according to illustrative embodiments. Photovoltaic generators 1320 may be coupled in parallel to form a portion of a parallel photovoltaic string. Each photovoltaic generator 1320 may comprise junction box 1321, and may be connected between a ground bus and a power bus. Photovoltaic generators 1320 and junction boxes 1321 of FIG. 13C may be the same as photovoltaic generators 1010 and junction boxes 1011 of FIG. 13A. The ground bus and power bus may comprise first splice connector 1012a and second splice connector 1012b for providing an electrical connection to a photovoltaic generator. For example, the power bus may provide a plurality of second splice connectors 1012b, each second splice connector 1012b designed to be connected to a photovoltaic generator female connector (e.g. female connector 1008b of FIG. 13A). Similarly, for example, the ground bus may provide a plurality of first splice connectors 1012a, each splice connector 1012a designed to be connected to a photovoltaic generator male connector (e.g. male connector 1008a of FIG. 13A). In some embodiments, a thermal fuse (e.g. integrated thermal fuse 1020) may be integrated into first splice connector 1012a and/or second splice connector 1012b, the thermal fuse designed to disconnect a photovoltaic generator from the splice connector upon an increase in temperature in our next to the thermal fuse, to prevent a faulty connection from causing a fire or other dangerous situation.

Figure 14:
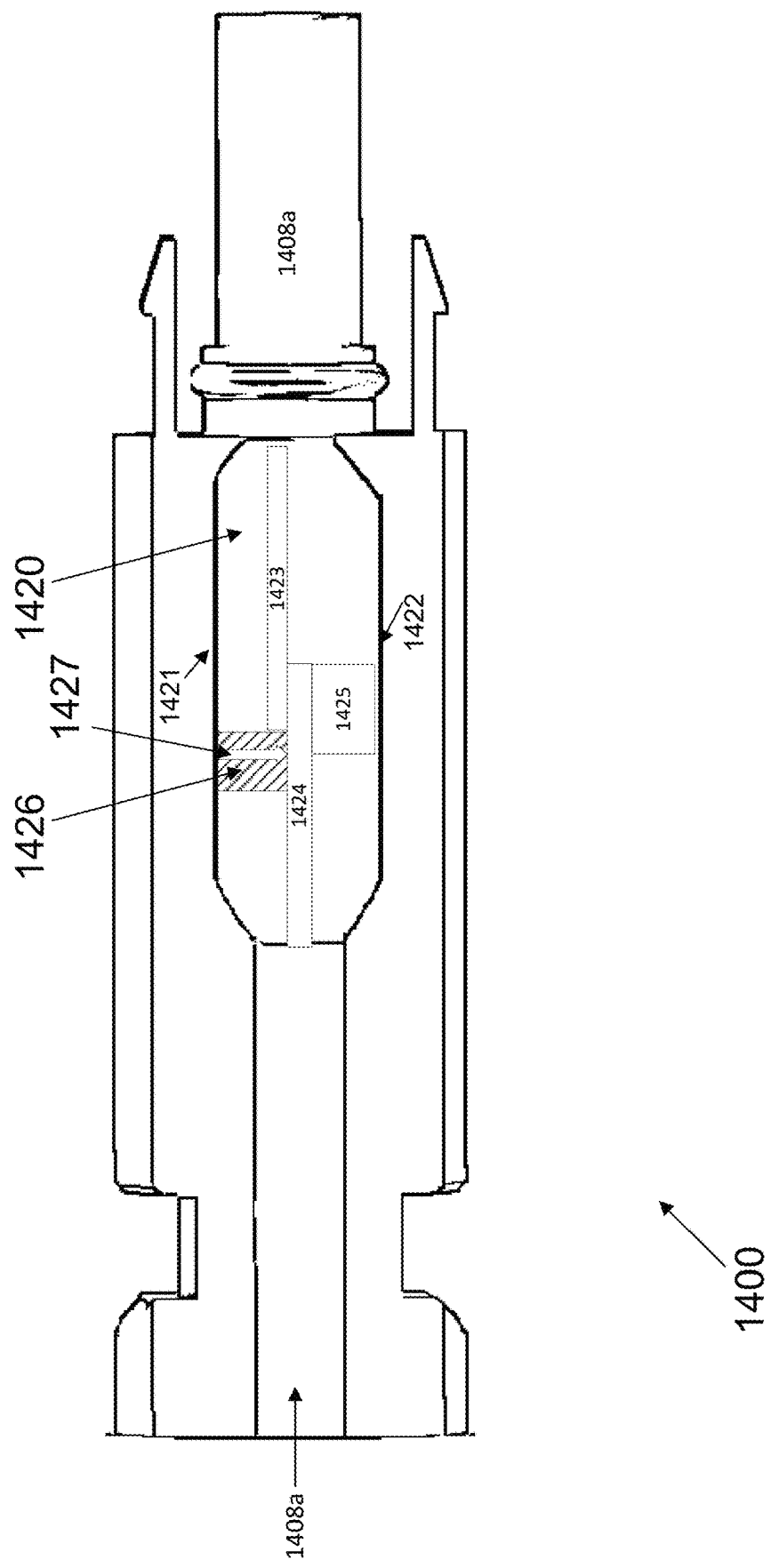
FIG. 14 depicts an integrated heat-detecting electrical connector according to one or more illustrative aspects of the disclosure.

Reference is now made to FIG. 14, which illustrates a thermal fuse connector 1400 according to illustrative embodiments. Thermal fuse connector 1400 may comprise male connector 1408a, female connector 1408b and thermal fuse therebetween. Thermal fuse 1420 may comprise conductors 1423 and 1424, and conductors 1423 and 1424 may provide a conductive path between male connector 1408a and female connector 1408b. Spring 1426 may be compressed between wall 1421 and conductor 1424, and may apply mechanical force to conductor 1424, in the direction indicated by arrow 1427. Pellet 1425 may be disposed between conductor 1424 and wall 1422 of thermal fuse 1420, preventing movement of conductor 1424. Pellet 1425 may be conductive or nonconductive, and may be made of various materials or compound material including elements such copper, tin, silver, beryllium, or ferrite. Pellet 1425 may be selected to have a melting temperature appropriate for disconnecting a circuit according to the safety requirements of the installation the fuse is disposed in. For example, in photovoltaic installations where it is desirable to disconnect a circuit in response to a temperature of 200° C. at a connection point, a pellet 1425 which melts or is deformed at about 200° C., or in a range around or slightly below 200° C., may be used. Spring 1426 may similarly be conductive or nonconductive.

Male connector 1408a may be designed to be connected to a female connector of a photovoltaic generator, such as female connector 1008b of FIG. 13A. Female connector 1408b may be designed to be connected to a male connector of a photovoltaic generator, such as male connector 1008a of FIG. 13A.

Referring back to FIG. 13A, some photovoltaic generators may have been already constructed using photovoltaic generators which do not include integrated thermal fuses. It may be desirable to add thermal fuses to existing systems, and/or to add thermal fuses to existing photovoltaic generators. Thermal fuse connector 1400 may be connected to existing photovoltaic generators or systems by connecting male connector 1408*a* to female connector 1008*b* of a photovoltaic generator, and connecting female connector 1408*b* to a male connector 1008*a* of a different photovoltaic generator. Similarly, thermal fuse connector 1400 may be connected to batteries, power converters, combiner boxes or other photovoltaic devices featuring connectors similar to male connector 1008*a* and female connector 1008*b*.

Figure 15:
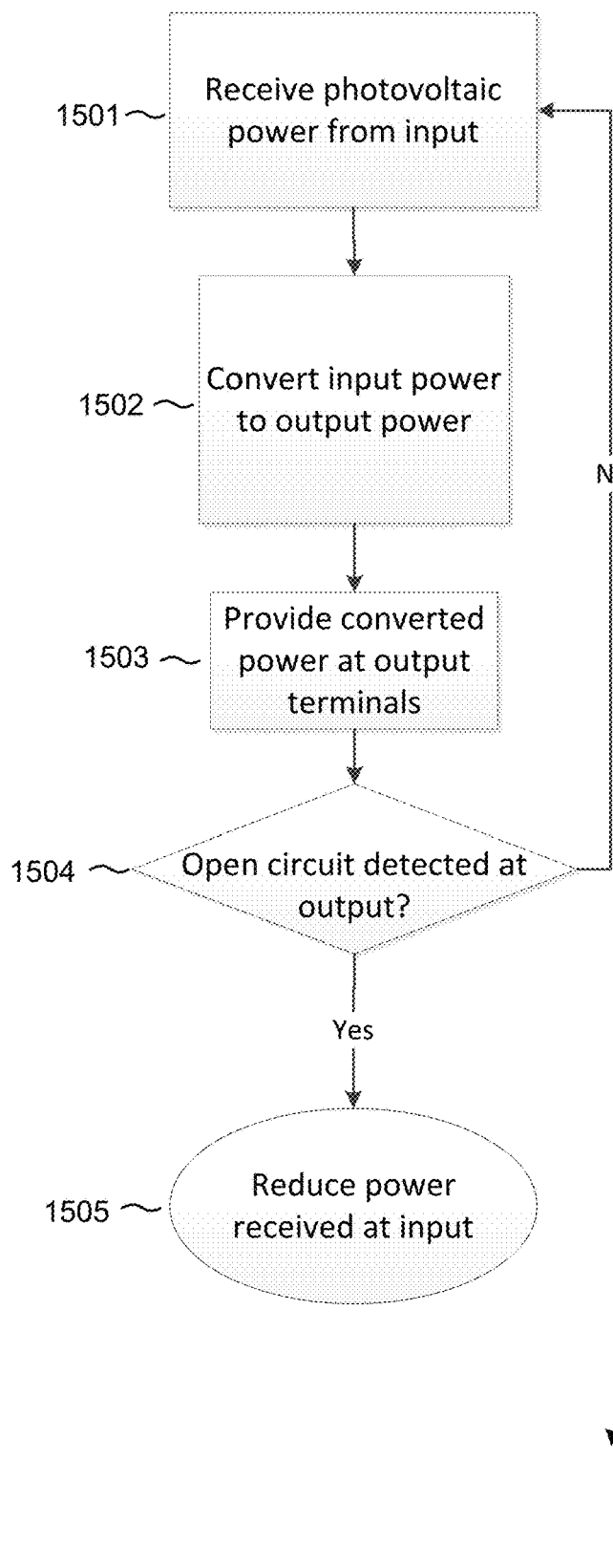
FIG. 15 depicts a method for operating a power converter according to one or more illustrative aspects of the disclosure.

Reference is now made to FIG. 15, which shows a method for operating a power converter according to illustrative embodiments. Method 1500 may be carried out by a controller (e.g. a Digital Signal Processor, Application-Specific Integrated Circuit, Field Programmable Logic Array, Microcontroller, and the like) configured to control a photovoltaic (PV) power device. At step 1501, the PV power device receives photovoltaic power at the device inputs. In some embodiments, the PV power device may receive photovoltaic power directly from a photovoltaic generator. In some embodiments, the PV power device may receive photovoltaic power from a group string of photovoltaic generators connected in series or in parallel, or may receive photovoltaic power combined in a combiner box. At steps 1502 and 1503, the PV power device may convert the power received at the input to power provided at the device output, and provide the converted power to output terminals, respectively. In some embodiments, the conversion may be from a direct current (DC) voltage to a DC voltage of the same or a different magnitude. In some embodiments, the conversion may be from direct current (DC) to alternating current (AC). In some embodiments, conversion might not take place, with input power being transferred as-is to the output. At step 1504, the controller may check for an open circuit condition at the device output. For example, a current sensor may measure output current, with a low measurement indicating a possible open circuit. An open circuit condition may be caused by a thermal fuse (e.g. a thermal fuse embedded in first connector 1008*a* or second 1008*b* of FIG. 13A, or a thermal fuse in a thermal fuse connector 1400) being tripped by an overtemperature condition. If no open-circuit condition is detected, the controller may return from step 1504 back to step 1501 and continue receiving photovoltaic power at the input.

If a potential open-circuit condition is detected (i.e. a thermal fuse may have tripped), the controller may proceed from step 1504 to step 1505 and reduce the power received at the input. For example, the controller may control switches to disconnect the input from a source of photovoltaic power (resulting in zero input current) or to short-circuit the input to the power device (resulting in zero input voltage). In some embodiments, step 1505 may include reporting the open-circuit condition and safety measures taken to a centralized control and/or data center.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, integrated cable 800 of FIG. 8A may be used as an output conductor 404*a* of power device 400 or as output conductor 604*a* of PV panel 610. As another example, the architecture illustrated in FIG. 11 and described with regard to the method of FIG. 10 may also be used to implement all or part of the method of FIG. 1. As another example, a power device may comprise one or more thermal fuses integrated into one or more power device connectors (e.g., as shown in FIG. 14), and may additionally comprise one or more thermal sensors disposed in proximity to the connectors, as shown in FIG. 2. The power device may be configured to provide a first level of protection by reducing power drawn at the input connectors in response to detecting an overheating condition, and the integrated fuses may provide a second level of protection in case the first level of protection does not provide a sufficient response.

The invention claimed is:

1. A method comprising;
providing a first conductor and a second conductor in direct contact with one another;
compressing a spring between the first conductor and a first surface to apply a force to the first conductor; and
providing a pellet between the first conductor and a second surface, the pellet sized and positioned to apply a counterforce to the first conductor, wherein the pellet is configured to deform at a predetermined temperature;
wherein, when the pellet deforms at the predetermined temperature, the spring is configured to disconnect the direct contact between the first conductor and the second conductor.

2. The method of claim 1, wherein the pellet is designed to deform at a temperature of about 200 degrees Celsius.

3. The method of claim 1, further comprising a photovoltaic generator, wherein the first conductor, second conductor, spring and pellet are disposed in a connector terminal of the photovoltaic generator.

4. The method of claim 1, further comprising a photovoltaic power device, wherein the first conductor, second conductor, spring and pellet are disposed in an output connector of the photovoltaic power device.

5. The method of claim 4, wherein the output connector of the photovoltaic power device is a male output connector terminal for connecting to a female output connector of a second photovoltaic power device.

6. The method of claim 4, wherein the output connector of the photovoltaic power device is a female output connector terminal for connecting to a male output connector of a second photovoltaic power device.

7. The method of claim 4, wherein the photovoltaic power device comprises at least one of a direct current to direct current converter and a direct current to alternating current converter.

8. The method of claim 1, wherein one conductor of the first conductor and the second conductor is connected to an electrical input for receiving photovoltaic power, and the other conductor of the first conductor and the second conductor is connected to an electrical output for providing photovoltaic power.

9. The method of claim 1, wherein the pellet comprises a compound comprising one of copper, tin, silver, beryllium, or ferrite.

10. The method of claim 1, wherein the force applied to the first conductor is applied substantially at a right angle to the first conductor.

11. A system comprising:
a first conductor and a second conductor in direct contact with one another;
a spring compressed between the first conductor and a first surface to apply a force to the first conductor; and a pellet disposed between the first conductor and a second surface, the pellet sized and positioned to of apply a counterforce to the first conductor, wherein the pellet is configured to deform at a predetermined temperature;

wherein, when the pellet deforms at the predetermined temperature, the spring is configured to disconnect the direct contact between the first conductor and the second conductor.

12. The system of claim 11, wherein the pellet is designed to deform at a temperature of about 200 degrees Celsius.

13. The system of claim 11, further comprising a photovoltaic generator, wherein the first conductor, second conductor, spring and pellet are disposed in a connector terminal of the photovoltaic generator.

14. The system of claim 11, further comprising a photovoltaic power device, wherein the first conductor, second conductor, spring and pellet are disposed in an output connector of the photovoltaic power device.

15. The system of claim 14, wherein the output connector of the photovoltaic power device is a male output connector terminal for connecting to a female output connector of a second photovoltaic power device.

16. The system of claim 14, wherein the output connector of the photovoltaic power device is a female output connector terminal for connecting to a male output connector of a second photovoltaic power device.

17. The system of claim 14, wherein the photovoltaic power device comprises at least one of a direct current to direct current converter and a direct current to alternating current converter.

18. The system of claim 14, wherein one conductor of the first conductor and the second conductor is connected to an electrical input for receiving photovoltaic power, and the other conductor of the first conductor and the second conductor is connected to an electrical output for providing photovoltaic power.

19. The system of claim 11, wherein the pellet comprises a compound comprising one of copper, tin, silver, beryllium, or ferrite.

20. The system of claim 11, wherein the force applied to the first conductor is applied substantially at a right angle to the first conductor.

* * * * *